(12) United States Patent
Smith et al.

(10) Patent No.: US 12,090,939 B2
(45) Date of Patent: Sep. 17, 2024

(54) COMPOSITE CRUSH CAN

(71) Applicant: JAGUAR LAND ROVER LIMITED, Warwickshire (GB)

(72) Inventors: James Smith, Warwickshire (GB); Colin Chung, Warwickshire (GB); Nicholas Hook, Warwickshire (GB); Frederic Sicard, Warwickshire (FR)

(73) Assignee: JAGUAR LAND ROVER LIMITED, Coventry (GB)

( * ) Notice: Subject to any disclaimer, the term of this patent is extended or adjusted under 35 U.S.C. 154(b) by 335 days.

(21) Appl. No.: 17/596,980

(22) PCT Filed: Jun. 23, 2020

(86) PCT No.: PCT/EP2020/067550
§ 371 (c)(1),
(2) Date: Dec. 22, 2021

(87) PCT Pub. No.: WO2020/260314
PCT Pub. Date: Dec. 30, 2020

(65) Prior Publication Data
US 2022/0266784 A1    Aug. 25, 2022

(30) Foreign Application Priority Data

Jun. 24, 2019   (GB) ..................... 1909005

(51) Int. Cl.
B60R 19/34     (2006.01)
B29C 70/40     (2006.01)
(Continued)

(52) U.S. Cl.
CPC .............. *B60R 19/34* (2013.01); *B29C 70/40* (2013.01); *B29C 70/46* (2013.01);
(Continued)

(58) Field of Classification Search
CPC ... B60R 19/34; B60R 2019/186; B60R 21/00; B60R 2021/0002; B60R 2021/0011;
(Continued)

(56) References Cited

U.S. PATENT DOCUMENTS 7,037,865 B1   5/2006  Kimberly
2007/0182170 A1   8/2007  Renault et al.

FOREIGN PATENT DOCUMENTS

DE   102016224367 A1   6/2018
FR      3011521 A1   4/2015
(Continued)

OTHER PUBLICATIONS

English translation of KR-1724498-B1 (Year: 2017).*
(Continued)

*Primary Examiner* — Jun S Yoo
(74) *Attorney, Agent, or Firm* — McCoy Russell LLP

(57) ABSTRACT

A method for making a crush can for a vehicle which has an internal moulded structure can include providing a crush can with a hole, filling the hole in the crush can with a fibre-reinforced material and compression moulding the fibre-reinforced material using the internal shape of the crush can as an outer shell of a split mould.

11 Claims, 21 Drawing Sheets

(51) Int. Cl.
*B29C 70/46* (2006.01)
*B29D 99/00* (2010.01)
*B29C 70/08* (2006.01)
*B60R 19/18* (2006.01)

(52) U.S. Cl.
CPC ...... *B29D 99/0003* (2013.01); *B23P 2700/50* (2013.01); *B29C 70/08* (2013.01); *B60R 2019/186* (2013.01); *Y10T 29/49622* (2015.01)

(58) Field of Classification Search
CPC ... B60R 2019/262; B29C 70/40; B29C 70/46; B29C 70/08; B29C 70/521; B29C 70/682; B29C 70/72; B29C 70/323; B29C 70/345; B29C 70/461; B29C 70/78; B29C 70/84; B29D 99/0003; B23P 2700/50; Y10T 29/49622; B60D 1/565; B62D 25/209
See application file for complete search history.

(56) References Cited

FOREIGN PATENT DOCUMENTS

| | | | |
|---|---|---|---|
| JP | 2013047092 | A | 3/2013 |
| KR | 20140031706 | A | 3/2014 |
| KR | 1724498 | B1 * | 4/2017 ........... B29C 43/184 |
| KR | 101724498 | B1 | 4/2017 |
| KR | 101791589 | B1 | 10/2017 |

OTHER PUBLICATIONS

Great Britain Intellectual Property Office, Combined Search and Examination Report under Sections 17 and 18(3) Issued in Application No. GB1909005.9, Dec. 10, 2019, 7 pages.

ISA European Patent Office, International Search Report and Written Opinion Issued in Application No. PCT/EP2020/067550, Sep. 23, 2020, WIPO, 10 pages.

* cited by examiner

COMPOSITE CRUSH CAN

TECHNICAL FIELD

The present disclosure relates generally to energy management systems for vehicles, particularly, but not exclusively, to composite crush cans. Aspects of the disclosure relate to a method of making a crush can with an internal moulded structure, to a crush can, a towing system and to a vehicle.

BACKGROUND AND SUMMARY

It is known to provide vehicles with an energy management system for managing the energy absorbed during a crash. A common type of energy management system comprises a metal bumper beam attached to a vehicle body at the front and/or rear via two metal crush cans. The purpose of a crush can is to deform and absorb energy during a crash, in the place of more expensive or difficult to replace components, whilst also increasing the safety of passengers during a crash by providing part of a "crumple zone". If a sufficiently high-energy crash occurs then the crush can is plastically deformed and crushed, but still attaches the bumper beam to the vehicle. This is important, as it would be disadvantageous for the bumper beam to become detached from the vehicle.

It is also known to provide a towing eye that provides attachment point for towing or anchoring a vehicle within a metallic crush can. Such a towing eye is generally a separate part to the crush can that is mounted within the crush can using a metal insert that allows the towing eye to screw into the insert. The space within the crush can provides a convenient location for the towing eye. In some examples the towing eye can be mounted within, or passing through, the bumper beam in place or in complement of the crush can.

There has recently been a significant drive towards improving fuel efficiency, or energy efficiency in the case of electric vehicles, so as to reduce the cost and environmental impact of vehicle use. This has led to increased interest in producing lightweight vehicle components, for example by replacing metallic components with lighter composite components. However, composites are known to shatter when subjected to high-energy impacts, so they are not typically used for components of systems that have to retain the energy management system after a crash.

It is an aim of the present disclosure at least in certain embodiments to address one or more disadvantages associated with the prior art.

A first aspect of the present disclosure comprises a method of making a component comprising a crush can comprising an internal moulded structure, the method comprising: providing a substantially hollow crush can; inserting a fibre-reinforced material into said substantially hollow crush can; moulding said fibre-reinforced material using the internal shape of the substantially hollow crush can as an outer shell of a split mould, at least one further part of the split mould being inserted into the crush can to form said internal moulded structure.

Making a crush can with an internal moulded structure in the above manner has several distinct advantages over the prior art. First, this method may reduce or remove the need to use attachment means such as adhesive or screws to hold the internal moulded structure in place, thus saving time in manufacturing, weight on the vehicle and cost in time and materials. Furthermore, using the internal shape of the crush can as the outer shell of a split mould may remove the need to manufacture/purchase the whole split mould for moulding and to manufacture the components separately, this may save valuable factory floor space, reduces labour costs and reduces time per unit made.

The method employs the crush can as an outer shell of a split mould. At least in certain embodiments, the crush can and the internal moulded structure are both part of the component. The crush can is not separated from the internal moulded structure following the moulding process. As such, the component comprises the crush can and the internal moulded structure.

The internal moulded structure may comprise one or more sidewall juxtaposed to a sidewall of the hollow crush can. The one or more sidewall of the internal moulded structure may extend in a substantially longitudinal direction. The or each sidewall of the internal moulded structure may comprise a taper, for example to form a draft angle to facilitate removal of a mould tool. The one or more sidewall may be fastened or bonded to an inner surface of the hollow crush can. The hollow crush can may comprise one or more features, such as a projection or a recess, for interlocking with the fibre-reinforced material which forms the internal moulded structure.

Alternatively, or in addition, the internal moulded structure may comprise a cross member extending in a transverse direction. The cross member may form a mounting structure for mounting an accessory, such as a towing eye or a connector. The cross member may form an end wall of the component. For example, the crush can may comprise a tubular member and the cross member may partially or completely close an end of the tubular member. The tubular member may comprise a circular, elliptical or polygonal profile in transverse section.

In an embodiment of the present disclosure the crush can is a substantially hollow composite crush can.

The crush can may be formed from a part or parts which is non-metallic. Forming the crush can from non-metallic parts removes the risk of galvanic corrosion occurring between the components or any added components such as a metallic towing eye. Metallic corrosion may fuse the components together or weaken the crush can, reducing its efficacy.

In a further embodiment the internal moulded structure is made by compression moulding. The method may comprise introducing the fibre-reinforced material into the crush can prior to performing compression moulding. The method may comprise inserting the further part of the split mould into the crush can to compress the fibre-reinforced material in the crush can. The internal moulded structure may be formed by the insertion of the further part of the split mould. The method may comprise removing the further part of the split mould after the compression moulding operation.

Compression moulding is a versatile, efficient, bottom-up technique and the inventors have recognised that using the internal features of the crush can as part of the compression moulding mould would be more efficient than prior art methods.

In a further embodiment the internal moulded structure is configured to receive a towing attachment.

The internal moulded structure can be configured to receive a towing attachment such that said towing attachment is easy to insert and remove and such that the internal mould is optimised to handle large mechanical loads such as from towing or winching.

In a further embodiment the internal moulded structure is internally threaded to compliment a threaded portion of said towing attachment.

Screwing the threaded portion of the threaded towing attachment into the internal moulded structure may provide a quick and effective means of affixing said towing means to the internal moulded structure.

In a further embodiment the method further comprises attaching a towing attachment to the internal moulded structure.

The towing attachment may comprise a threaded shank at a first end. In a further embodiment the towing attachment comprises a threaded shank at a first end and a towing eye at a second end, and wherein the towing attachment is attached to the internal moulded structure by screwing the first end into a corresponding feature in the internal moulded structure.

In a further embodiment the fibre-reinforced material comprises a plurality of fibres embedded in a polymeric material.

Using a plurality of fibres embedded in a polymeric material may allow the mechanical properties of the component to be configured such that they are appropriate for a certain task.

In a further embodiment the fibre-reinforced material is sheet moulding compound.

Sheet moulding compound may provide a cheap (inexpensive), corrosion resistant material that is well suited for the present application.

In a further embodiment the internal moulded structure comprises a reinforcing structure having a tapered wall.

Including an internal reinforcing structure may increase the efficacy of the crush can without taking up any further space on the vehicle. Tapering the wall may allow the crush can to be designed to deform in a planned manner when under strain during a collision event.

In a further embodiment the step of providing a crush can comprises providing a substantially hollow crush can wherein the substantially hollow crush can is configured to couple a bumper beam to a supporting structure of a vehicle. The substantially hollow crush can may have a first fixing means at a first end, a second fixing means at a second end, a frangible portion and a non-frangible portion extending between and fixedly coupled to the first fixing means and the second fixing means. The crush can may be a crush can as described in any of the embodiments or aspects herein.

Including frangible portions on a crush can may allow for a large amount of energy to be harmlessly absorbed from the perspective of the occupants and other more expensive components of the vehicle. Also including a non-frangible portion may ensure that the bumper beam is retained in the event of a crash because the frangible portion should merely deform rather than be destroyed. This may make the scene of a crash easier to clear as the bumper beam will not become debris and increases the chance that the car can be driven away from the scene without roadside repair.

According to a further aspect of the present disclosure there is provided a method of making a component comprising a crush can, the method comprising:
  providing a hollow component for forming an outer layer of the crush can;
  introducing a fibre-reinforced material into the hollow component; and
  moulding an internal structure in the component from the fibre-reinforced material, wherein an outer profile of at least some of the internal structure is defined by an internal shape of the hollow component. The internal structure may form an energy absorbing structure.

The method may comprise inserting a mould part into the component. The mould part may comprise or consist of a male mould or a female mould. The fibre-reinforced material may be injected into the hollow component. The method may comprise inserting the mould part into the component before the fibre-reinforced material is introduced into the component. Alternatively, the method may comprise inserting the mould part after the fibre-reinforced material is introduced into the component. The mould part may be introduced into the fibre-reinforced material within the component. The mould part may define a shape or profile of at least some of the internal structure. The mould part may define an inner profile of at least some of the internal structure. The method may comprise curing the fibre-reinforced material. The method may comprise removing the mould part after the fibre-reinforced material has cured.

The internal structure may be compression moulded. The method may comprise inserting the mould part into the component to compression mould the internal structure. The method may comprise removing the mould part after the compression moulding operation.

The internal structure may comprise one or more sidewall juxtaposed to a sidewall of the hollow component. The one or more sidewall of the internal structure may extend in a substantially longitudinal direction. The or each sidewall of the internal moulded structure may comprise a taper, for example to form a draft angle to facilitate removal of a mould tool. The one or more sidewall may be fastened or bonded to an inner surface of the hollow component. The hollow component may comprise one or more features, such as a projection or a recess, for interlocking with the fibre-reinforced material which forms the internal structure.

Alternatively, or in addition, the internal moulded structure may comprise a cross member extending in a transverse direction. The cross member may form a mounting structure for mounting an accessory, such as a towing eye or a connector. The cross member may form an end wall of the component. For example, the crush can may comprise a tubular member and the cross member may partially or completely close an end of the tubular member. The tubular member may comprise a circular, elliptical or polygonal profile in transverse section.

According to a further aspect of the present disclosure there is provided a method of making a crush can, the method comprising:
  providing a hollow component for forming an outer portion of the crush can;
  introducing a fibre-reinforced material into the hollow component; and
  moulding an inner portion of the crush can from the fibre-reinforced material, wherein an outer profile of the inner portion is defined by an internal shape of the hollow component. The inner portion and the outer portion may comprise an inner layer and an outer layer respectively. The inner and outer layers may form a dual-layer sidewall of the crush can.

The method may comprise inserting a mould part into the component. The mould part may comprise or consist of a male mould or a female mould. The mould part may form an aperture in the crush can, for example to form a cavity or chamber in the crush can. The inner portion of the crush can may be hollow. The inner portion may comprise a tube, for example having a circular, oval or polygonal transverse section.

The fibre-reinforced material may be injected into the component. The method may comprise inserting the mould part into the component before the fibre-reinforced material is introduced into the component. Alternatively, the method may comprise inserting the mould part after the fibre-reinforced material is introduced into the component. The mould part may be introduced into the fibre-reinforced material within the component. The mould part may define a shape or profile of at least some of the inner portion. The method may comprise curing the fibre-reinforced material. The method may comprise removing the mould part after the fibre-reinforced material has cured.

The inner portion may be compression moulded in the crush can. The method may comprise inserting the mould part into the component to compression mould the inner portion. The method may comprise curing the fibre-reinforced material when the mould part is disposed in the inner portion of the component. The method may comprise removing the mould part after the compression moulding operation.

The method may comprise forming an internal structure inside the crush can. The internal structure may be suitable for mounting a towing eye in the crush can. In certain embodiments, the method may comprise moulding the internal structure inside the inner portion of the crush can. The inner portion of the crush can may be hollow. The method may comprise introducing a fibre-reinforced material into the inner portion, for example into a hollow central portion of the inner portion. An outer profile of at least some of the internal structure may be defined by an internal profile of the inner portion of the crush can.

The method may comprise inserting a mould part into the hollow central portion of the inner portion of the crush can to form the internal structure. The mould part may comprise or consist of a male mould or a female mould. The method may comprise inserting the mould part into the component after introducing the fibre-reinforced material into the inner portion. Alternatively, the method may comprise inserting the mould part after the fibre-reinforced material is introduced into the component. The mould part may be introduced into the fibre-reinforced material within the component.

The fibre-reinforced material for forming the inner portion of the crush can and/or the internal structure may comprise a sheet moulding compound (SMC). The sheet moulding compound may comprise carbon fibres. Alternatively, the sheet moulding compound may comprise aramid fibres, plastic fibres, basalt fibres, glass fibres or natural fibres such as flax, jute or hemp fibres.

The crush can may comprise a box section. The box section may have a closed sidewall, for example comprising a polygonal, elliptical or circular profile (in transverse section). In other embodiments, the crush can may comprise a channel section, for example comprising a U-shaped profile or a C-shaped profile (in transverse section). In this arrangement, one side of the crush can is open.

A further aspect of the present disclosure relates to a component comprising a composite crush can having an internal moulded structure the internally-moulded structure being formed of a fibre-reinforced material, wherein the crush can has an internal moulded structure, configured to couple a towing attachment whereby the internal moulded structure is integrally formed within the crush can.

Integrally forming the internal moulded structure with the crush can may be an efficient way of manufacturing the crush can because it requires fewer steps to complete, and may reduce or remove the need for fixings such as screws or adhesive and may be lighter and optimised for bearing loads.

In a further embodiment of the present disclosure the crush can comprises a towing attachment connected to the internal moulded structure.

The towing attachment may be used to mechanically link a vehicle to another for towing, winching or strapping for transportation.

In a further embodiment of the present disclosure the fibre-reinforced material is sheet moulding compound (SMC).

The sheet moulding compound (SMC) may comprise carbon fibres. Alternatively, the sheet moulding compound may comprise aramid fibres, plastic fibres, basalt fibres, glass fibres or natural fibres such as flax, jute or hemp fibres.

The crush can may comprise a metallic insert, such as the aforementioned towing attachment. If the sheet moulding compound (SMC) does not contain significant amounts of carbon fibre, then no galvanic corrosion will occur when the SMC contacts the metallic insert. If the SMC does contain significant amounts of carbon fibres, then the metallic insert may be made from or coated with stainless steel.

In an embodiment, the present disclosure provides an energy management system comprising a bumper beam and at least one crush can, the at least one crush can as described above. The crush can may comprise at least one frangible portion, and at least one non-frangible portion. The bumper beam may be attached to the non-frangible portion of the crush can; and the non-frangible portion of the at least one crush can is provided with a vehicle fixing portion configured to be attached to a vehicle (for example to a vehicle structure, a vehicle body or a mount).

The bumper beam is attached to the at least one crush can via at least one fixing passing through at least one bumper beam fixing aperture in the at least one crush can; the at least one crush can provided with vehicle fixing apertures configured to receive a fixing to attach the crush cans to a vehicle; and each of the bumper beam fixing apertures and vehicle fixing apertures passes through the non-frangible portion of the at least one crush can. It will be understood that the frangible portion and the non-frangible material may be made from different composite materials. The non-frangible portion may be capable of absorbing a higher amount of energy (per unit mass) upon impact than the frangible portion.

A further aspect of the present disclosure provides a vehicle comprising at least one of: a component made by the above method or, the component as described above, or the energy management system described above.

A further aspect of the present disclosure relates to an energy management system comprising a bumper beam and at least one composite crush can, the at least one crush can comprising at least one frangible portion, and at least one non-frangible portion; wherein the bumper beam is attached to the non-frangible portion of the crush can; and the non-frangible portion of the at least one crush can is provided with a vehicle fixing portion configured to be attached to a vehicle. It will be understood that the frangible portion and the non-frangible material may be made from different composite materials, wherein the non-frangible portion is capable of absorbing a higher amount of energy (per unit mass) upon impact than the frangible portion.

The at least one crush can may comprise at least one fixing aperture configured to receive a fixing. The at least one fixing aperture may extend through the at least one frangible portion and through the at least one non-frangible portion of the crush can. In use, the fixing may locate in the fixing aperture and extend through the or each frangible portion and the or each non-frangible portion. Thus, the fixing may inhibit relative movement of the or each frangible portion and the or each non-frangible portion. The fixing may mount or fasten the crush can, for example to a body structure of a vehicle.

The crush can may comprise an internal moulded structure. The internal moulded structure may, for example, be formed of a fibre-reinforced material. The at least one fixing aperture may extend through the internal moulded structure. In use, a fixing may locate in each fixing aperture so as to extend through the internal moulded structure. The fixing may inhibit relative movement of the internal moulded structure.

The crush can may comprise a box section or a tubular section. The box section may comprise a closed polygonal section, for example having a rectangular section.

The crush may comprise a channel section having a central section and opposing first and second sidewalls. The at least one fixing aperture may extend through the first and second sidewalls. One side of the crush can is open in this arrangement. For instance, the side of the crush can opposing the central section is open.

Including frangible portions on a crush can may allow for a large amount of energy to be harmlessly absorbed from the perspective of the occupants and other more expensive or difficult to replace components of the vehicle. Also including a non-frangible portion may ensure that the bumper beam is retained in the event of a crash because the frangible portion should merely deform rather than be destroyed. This may make the scene of a crash easier to clear as the bumper beam will not become debris and increases the chance that the car can be driven away from the scene without requiring roadside repair.

In a further embodiment of the present disclosure the at least one crush can is attached to a vehicle via at least one fixing passing through the vehicle fixing aperture.

In a further embodiment of the present disclosure the non-frangible portion comprises at least one of; a layer of non-frangible fibres, each layer of fibres being fixed within a resin, a sleeve of non-frangible material, one or more threads of non-frangible material.

There are a variety of ways of arranging the non-frangible fibres, depending on different requirements relating to the desired material properties of the completed crush can. Depending on several factors such as the mechanical properties of the materials used, weight considerations, number of crush cans in parallel and the properties of the bumper beam it may not be necessary to devote a full layer of the crush can to non-frangible material. In some cases, including a sleeve of non-frangible material around the frangible portion will have the desired effect of ensuring the crush can remains at least partially intact in the case of a collision event. In some circumstances one or more threads of non-frangible material may be enough to ensure that the bumper beam does not drop off the vehicle in the event of a collision.

In a further embodiment of the present disclosure the non-frangible fibres comprise at least one of glass fibre, polypropylene, ultra-high-molecular-weight polyethylene, metal fibres or metal strips.

There are various non-frangible materials that are suitable for this application. Importantly, the non-frangible fibres must deform under strain rather than be destroyed as the purpose of the non-frangible fibres is to change shape, absorb energy and retain enough structural integrity to hold the bumper beam in place in the event of a collision event. It will be understood that in embodiments in which the crush can comprises frangible fibres and non-frangible fibres, the non-frangible material may be made from different materials to the frangible fibres, wherein the non-frangible fibres are capable of absorbing a higher amount of energy (per unit mass or per unit length) upon impact than the frangible fibres.

In an embodiment the bumper beam is attached to the non-frangible portion via at least one fixing passing through at least one bumper beam fixing aperture in the at least one crush can. The vehicle fixing portion may comprise a vehicle fixing aperture configured to receive a fixing to attach the at least one crush can to the vehicle. The at least one fixing aperture may comprise the at least one vehicle fixing aperture formed in the vehicle fixing portion. The bumper beam fixing aperture may pass through the non-frangible portion of the crush can. At least in some embodiments, the vehicle fixing aperture may pass through the non-frangible portion of the crush can.

In an embodiment, the at least one crush can is attached to a vehicle via at least one fixing passing through the vehicle fixing aperture.

In a further embodiment of the present disclosure the frangible portion comprises a plurality of layers of frangible fibres, each layer of fibres being fixed within a resin.

Layering of frangible fibres may allow for a tuneable amount of energy to be absorbed by the crush can, with other considerations such as weight and volume also being taken into account. Fixing the layers of fibres in a resin increases the longevity and structural integrity of the crush can, ensuring that it will not degrade quickly over time.

In a further embodiment of the present disclosure the frangible fibres comprise one or more of the following: carbon fibres, aramid fibres, plastic fibres, basalt fibres, glass fibres or natural fibres such as hemp, jute and flax.

Tuning the mechanical properties of the frangible fibres is important as they must absorb the maximum possible energy whilst also being cheap, light and easily replaced. Aramid fibres and carbon fibres can be produced in various forms and thicknesses; therefore, they make good candidates as frangible fibres for a crush can.

In a further embodiment of the present disclosure the non-frangible fibres are formed as strands.

Forming the non-frangible fibres as strands may save weight and material costs over forming the non-frangible fibres as a full layer around or beneath the frangible layer.

In a further embodiment of the present disclosure the non-frangible fibres are formed as a net.

Forming the non-frangible fibres as a net may save weight and material costs over forming the non-frangible fibres as a full layer around or beneath the frangible layer.

In a further embodiment of the present disclosure the layer of fibres is formed by a pultrusion process.

In a further embodiment of the present disclosure the layer of fibres forms a non-prismatic section.

Forming the layers of fibres as a non-prismatic section allows the designing engineer to consider how they want the crush can to deform under strain, meaning that the energy management system may be tuned to direct energy in a preferred direction to protect the passenger and vital or expensive vehicle components.

In a further embodiment of the present disclosure the non-prismatic section is flanged at least one end.

Having a flanged crush can may mean that the components to which the crush can is attached do not need to be flanged in order to accommodate fixing means. If the flange on the crush can is damaged in a collision event that is better than if the other components of the vehicle are damaged because the crush can is designed to be a sacrificial component that would need to be replaced anyway, whereas if the body of the vehicle is damaged, this will need to be repaired or replaced as well as the replacement crush can.

In an embodiment, the non-frangible portion of the at least one crush can is attached to the bumper beam via an adhesive, and wherein the vehicle fixing portion comprises an exposed surface of the non-frangible portion, whereby the exposed surface of the non-frangible portion may be attached to the vehicle via an adhesive.

A further aspect of the present disclosure provides a vehicle comprising an energy management system as described above, the energy management system being attached to a body of the vehicle via a plurality of fixings each passing through one of the vehicle fixing apertures.

Attaching the energy management system to the vehicle body via a plurality of fixings decreases the chance that all of the fixings will fail simultaneously allowing more energy to be safely transmitted into the energy management system before catastrophic failure.

A further aspect of the present disclosure provides a crush can configured to couple a bumper beam to a supporting structure of a vehicle, the crush can having a first fixing means at a first end, a second fixing means at a second end, a frangible portion and a non-frangible portion. The non-frangible portion may extend between and be fixedly coupled to the first fixing means and the second fixing means.

The at least one crush can may comprise at least one fixing aperture configured to receive a fixing. The at least one fixing aperture may extend through the at least one frangible portion and through the at least non-frangible portion of the crush can.

The frangible portion may optionally also extend between the first fixing means and the second fixing means. The frangible portion may optionally be fixedly coupled to the first fixing means and the second fixing means.

The at least one fixing aperture may be formed in the opposing first and second sidewalls. The fixing may extend through the fixing apertures formed in the first and second sidewalls to mount the crush can.

The crush can may comprise a box section or a tubular section. The box section may comprise a closed polygonal section, for example having a rectangular section.

Alternatively, the crush may comprise a channel section having a central section and opposing first and second sidewalls.

According to a further aspect of the present disclosure there is provided a crush can configured to couple a bumper beam to a supporting structure of a vehicle, the crush can having a first fixing means at a first end, a second fixing means at a second end, a frangible portion and a non-frangible portion. The non-frangible portion may extend between and is fixedly coupled to the first fixing means and the second fixing means.

The crush can may comprise a channel section having a central section and opposing first and second sidewalls. In transverse section, the crush can may be in the form of a channel One side of the crush can is open along its length. For instance, the side of the crush can opposing the central section is open.

The channel section may comprise an open polygonal section. For example, the channel section may be C-shaped or U-shaped. The crush can may comprise a central section and opposing first and second sidewalls. The first and second sidewalls may extend substantially parallel to each other. At least in certain embodiments, the first and second sidewalls may extend substantially perpendicular to the central section.

The first sidewall and/or the second sidewalls of the channel section may have a tapered section. The first sidewall and/or the second sidewall may be tapered towards respective outer edges thereof. For example, the first sidewall and/or the second sidewall may be tapered in a transverse direction (perpendicular to a longitudinal axis of the crush can). The thickness of the first sidewall and/or the second sidewall may be greatest proximal to the central section. The thickness of the first sidewall and/or the second sidewall may be smallest distal from the central section. The first and second sidewalls may have a substantially uniform profile along a length of the crush can (i.e. in a longitudinal direction).

The crush can may comprise at least first and second layers. The at least first and second layers may be bonded to each other. Alternatively, one or more mechanical fasteners may extend through the first and second layers of the crush can to inhibit relative movement. The crush can may have a dual-layer structure, for example. The crush can may comprise or consist of an outer portion and an inner portion. The first layer may form the outer portion of the crush can. The second layer may form the inner portion of the crush can. This arrangement may be reversed such that first layer forms the inner portion and the second layer forms the outer portion.

The first layer may form the at least one non-frangible portion of the crush can; and the second layer may form the at least one frangible portion of the crush can. In a variant, this arrangement may be reversed. For example, the first layer may form the at least one frangible portion of the crush can; and the second layer may form the at least one non-frangible portion of the crush can.

The first layer may have a substantially uniform thickness.

The second layer may comprise one or more tapered sections. The or each tapered section may comprise or consist of a substantially continuous taper. The second layer may comprise a first tapered section which forms at least a portion of the first sidewall. The second layer may comprise a second tapered section which forms at least a portion of the second sidewall. The second layer may form the tapered first sidewall and/or the tapered second sidewall. The first tapered section and/or the second tapered sections may be tapered towards the outer edges of the respective first and second sidewalls.

The crush can may be hollow. Alternatively, the crush can may have a filled interior. For example, an interior structure may be moulded in the crush can.

Including frangible portions on a crush can may allow for a large amount of energy to be harmlessly absorbed from the perspective of the occupants and other more expensive components of the vehicle. Also including a non-frangible portion may ensure that the bumper beam is retained in the event of a crash because the frangible portion should merely deform rather than be destroyed. This may make the scene of a crash easier to clear as the bumper beam will not become debris and increases the chance that the car can be driven away from the scene without requiring roadside repair.

In a further embodiment of the present disclosure the non-frangible portion comprises at least one of; a layer of non-frangible fibres, each layer of fibres being fixed within a resin, a sleeve of non-frangible material, one or more threads of non-frangible material.

There are a variety of ways of arranging the non-frangible fibres, depending on different requirements relating to the desired material properties of the completed crush can.

Depending on several factors such as the mechanical properties of the materials used, weight considerations, number of crush cans in parallel, the properties of the bumper beam it may not be necessary to devote a full layer of the crush can to non-frangible material. In some cases, including a sleeve of non-frangible material around the frangible portion will have the desired effect of ensuring the crush can remains at least partially intact in the case of a collision event. In some circumstances one or more threads of non-frangible material may be enough to ensure that the bumper beam does not drop off the vehicle in the event of a collision.

In a further embodiment of the present disclosure the non-frangible fibres comprise at least one of glass fibre, polypropylene, ultra-high-molecular-weight polyethylene, metal fibres or metal strips.

There are various non-frangible materials that are suitable for this application. Importantly, the non-frangible fibres must deform under strain rather than be destroyed, as the purpose of the non-frangible fibres is to retain enough structural integrity to hold the bumper beam in place in the event of a collision. They may also absorb some of the energy from the collision, although it will be understood that the primary source of energy absorption may be the destruction of the frangible fibres.

In a further embodiment of the present disclosure the frangible portion comprises a plurality of layers of frangible fibres, each layer of fibres being fixed within a resin.

Layering of frangible fibres allows for a tuneable amount of energy to be absorbed by the crush can, with other considerations such as weight and volume also being taken into account. Fixing the layers of fibres in a resin increases the longevity and structural integrity of the crush can, ensuring that it will not degrade quickly over time.

In a further embodiment of the present disclosure the frangible fibres comprise carbon fibres, aramid fibres, plastic fibres, basalt fibres, glass fibres or natural fibres.

Tuning the mechanical properties of the frangible fibres is important as they must absorb the maximum possible energy whilst also being cheap, light and easily replaced. Aramid fibres and carbon fibres can be produced in various forms and thicknesses; therefore, they make good candidates as frangible fibres for a crush can.

In a further embodiment of the present disclosure the non-frangible fibres are formed as strands.

Forming the non-frangible fibres as strands may save weight and material costs over forming the non-frangible fibres as a full layer around or beneath the frangible layer.

In a further embodiment of the present disclosure the non-frangible fibres are formed as a net.

Forming the non-frangible fibres as a net may save weight and material costs over forming the non-frangible fibres as a full layer around or beneath the frangible layer.

In a further embodiment of the present disclosure the layer of fibres is formed by a pultrusion process.

In a further embodiment of the present disclosure the layer of fibres form a non-prismatic section.

Forming the layers of fibres as a non-prismatic section may allow the designing engineer to consider how they want the crush can to deform under strain, meaning that the energy management system may be tuned to direct energy in a preferred direction to protect the passenger and vital or expensive vehicle components.

In a further embodiment of the present disclosure the non-prismatic section is flanged at least one end.

Having a flanged crush can may mean that the components to which the crush can is attached do not need to be flanged in order to accommodate fixing means. If the flange on the crush can is damaged in a collision event that is better than if the other components of the vehicle are damaged because the crush can is designed to be a sacrificial component that would need to be replaced anyway, whereas if the body of the vehicle is damaged, this will need to be repaired or replaced as well as the replacement crush can.

A further aspect of the present disclosure relates to a composite crush can. The composite crush can may form part of an energy management system comprising a bumper beam and one or more composite crush cans.

In some embodiments of the present disclosure, the bumper beam may be metallic. Alternatively, the bumper beam may be formed of composites or any other material.

A further aspect of the present disclosure relates to an energy management system comprising a bumper beam and at least one composite crush can, the at least one crush can comprising at least one frangible portion, and at least one non-frangible portion; the bumper beam is attached to the at least one crush can via at least one fixing passing through at least one bumper beam fixing aperture in the at least one crush can; the at least one crush can provided with vehicle fixing apertures configured to receive a fixing to attach the crush cans to a vehicle; and each of the bumper beam fixing apertures and vehicle fixing apertures passes through the non-frangible portion of the at least one crush can.

A further aspect of the present disclosure relates to a method manufacturing the crush can as described herein. The method may comprise pultrusion. The use of pultrusion to form the crush can enables the fibres controllably to be aligned within the crush can. The process may comprise drawing continuous fibres into a mould or forming apparatus. The continuous fibres may, for example, be drawn from a reel or other source. Forming the crush can using pultrusion may enable some or all of the fibres to be oriented along a crush direction of the crush can. The crush direction may be aligned with a longitudinal axis of the crush can. In use, the crush direction may extend parallel to a longitudinal axis of the vehicle.

The crush can may consist of unidirectional fibres, for example aligned with the crush direction. In a variant, the crush can may comprise first fibres aligned with the crush direction; and second fibres inclined at an acute angle to the crush direction. The second fibres may be inclined at an angle to the crush direction, for example ±30°, ±45° or ±60°. The composition of the crush can may comprise 25% of the first fibres and 75% of the second fibres, for example. The first fibres may be supplied as continuous fibres using the pultrusion process. The second fibres may be supplied as a woven material or fabric.

The non-frangible layers may be formed in a first pultrusion operation; and the frangible layers may be formed in a second pultrusion operation.

It will be understood that the crush can may be formed with two or more layers. As described herein, the crush can may comprise at least a first layer and a second layer. The first layer may be formed by pultrusion. The second layer may be moulded inside the first layer, for example using the moulding techniques described herein.

Within the scope of this application it is expressly intended that the various aspects, embodiments, examples and alternatives set out in the preceding paragraphs, in the following description and drawings, and the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which.

DETAILED DESCRIPTION

Figure 1:
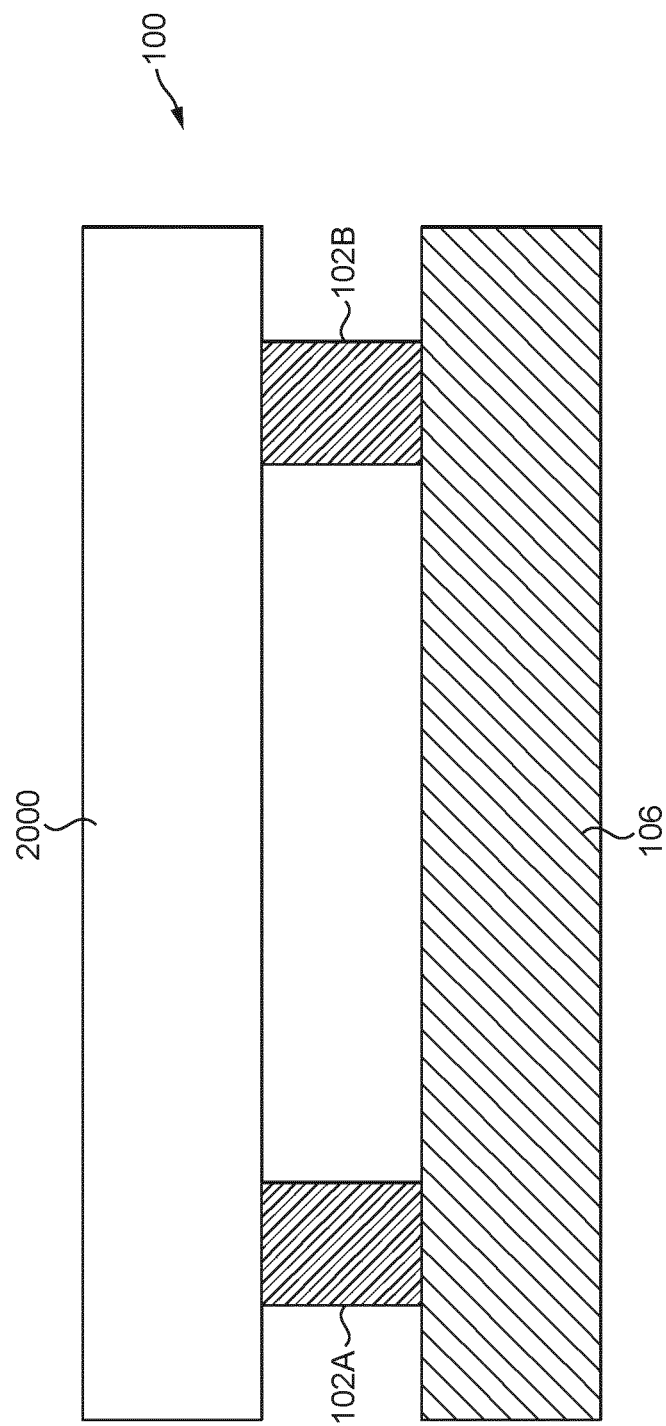
FIG. 1 shows an embodiment of the present disclosure wherein two crush cans connect a bumper beam to a vehicle.

FIG. 1 shows an energy management system 100 in an embodiment of the present disclosure attached to a vehicle body 2000. The energy management system comprises a metal bumper beam 106 attached to the vehicle via crush cans 102A and 102B. Although the fixing means are not shown in FIG. 1, it will be understood that each of the bumper beam 106 and the vehicle body 2000 is provided with spigots (not shown) that fit inside the respective crush cans, and one or more bolts are provided to pass through the spigot and the crush can, thereby attaching the ends of the crush can to the vehicle body 2000 and the bumper beam 106. Each of the crush cans 102A, 102B are made from composite materials comprising a plurality of fibres embedded within a matrix.

The system shown in FIG. 1 is similar to prior art energy management systems, except that prior art systems employ metal crush cans rather than composite crush cans. As will be discussed in more detail below, there are various advantages associated with the use of composite crush cans rather than metal crush cans, including reduced weight and reduced incidence of galvanic corrosion. Although the embodiment in FIG. 1 comprises a metallic bumper beam, it will be understood that in other embodiments the bumper beam may be made from a composite or other material. Furthermore, although mechanical fixings are shown in FIG. 1, it will be understood that other fixings such as adhesives may be used in alternative embodiments.

Figure 2:
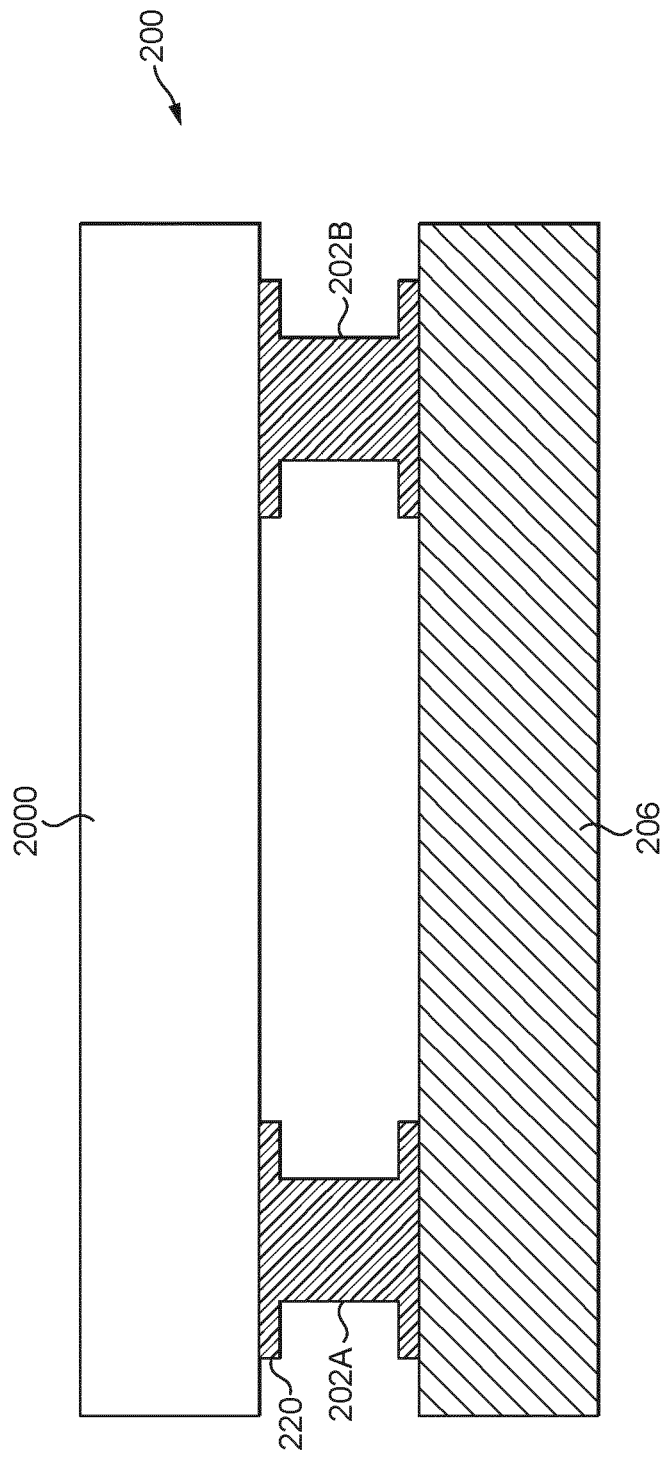
FIG. 2 shows a further embodiment of the present disclosure wherein the crush cans are flanged crush cans.

FIG. 2 shows another energy management system 200 attached to a vehicle 2000, in which the bumper beam 206 is attached to the vehicle via flanged 220 crush cans 202A, 202B. Accordingly, it is not necessary to provide spigots on the bumper beam 206 or the vehicle body 2000. Again, the bumper beam is made from a metal and each of the crush cans 202A, 202B are made from a composite material comprising a plurality of fibres embedded within a matrix.

Either of the systems shown in FIGS. 1 and 2 may be attached at the front or rear of a vehicle, with the intention to absorb energy by the crush cans in a collision event. In prior art energy management systems, the absorption of energy is primarily a result of the plastic deformation of the metal crush cans. However, although the crush cans plastically deform to a very significant degree in prior art systems, they maintain the attachment of the bumper bean to the vehicle. This is an important requirement, as it is usually considered essential to maintain the connection of the bumper beam to the vehicle after a crash event.

Prior art energy management systems contribute a significant amount of weight to the vehicle. The present disclosure reduces the weight of the system as compared to prior art energy management systems, by replacing the crush cans 102A, 102B with a lighter composite material that is capable of absorbing similar amounts of energy to the equivalent metal component. Although composite materials comprising fibres embedded within a polymeric matrix are able to provide similar energy absorption to equivalent metal parts having a greater weight, they have hitherto been considered impractical for use in energy management systems. The present inventors have recognised that one barrier to the adoption of composite materials in energy management systems is that they generally fracture when absorbing significant amounts of energy, which leads to an unacceptable risk that a large component such as all or part of a bumper beam will detach from the vehicle following a crash. Accordingly, a particular object of the present disclosure is to provide a composite crush can that maintains the connection between the vehicle body 2000 and the bumper beam 106, even after a high-energy collision.

A further advantage of the present disclosure is that, because the amount of energy absorbed by a composite crush can per unit mass and/or per unit volume may be higher than for an equivalent metal crush can, the length of the crush cans may be reduced. This may provide a corresponding reduction in the length of the energy management system.

Figure 3:
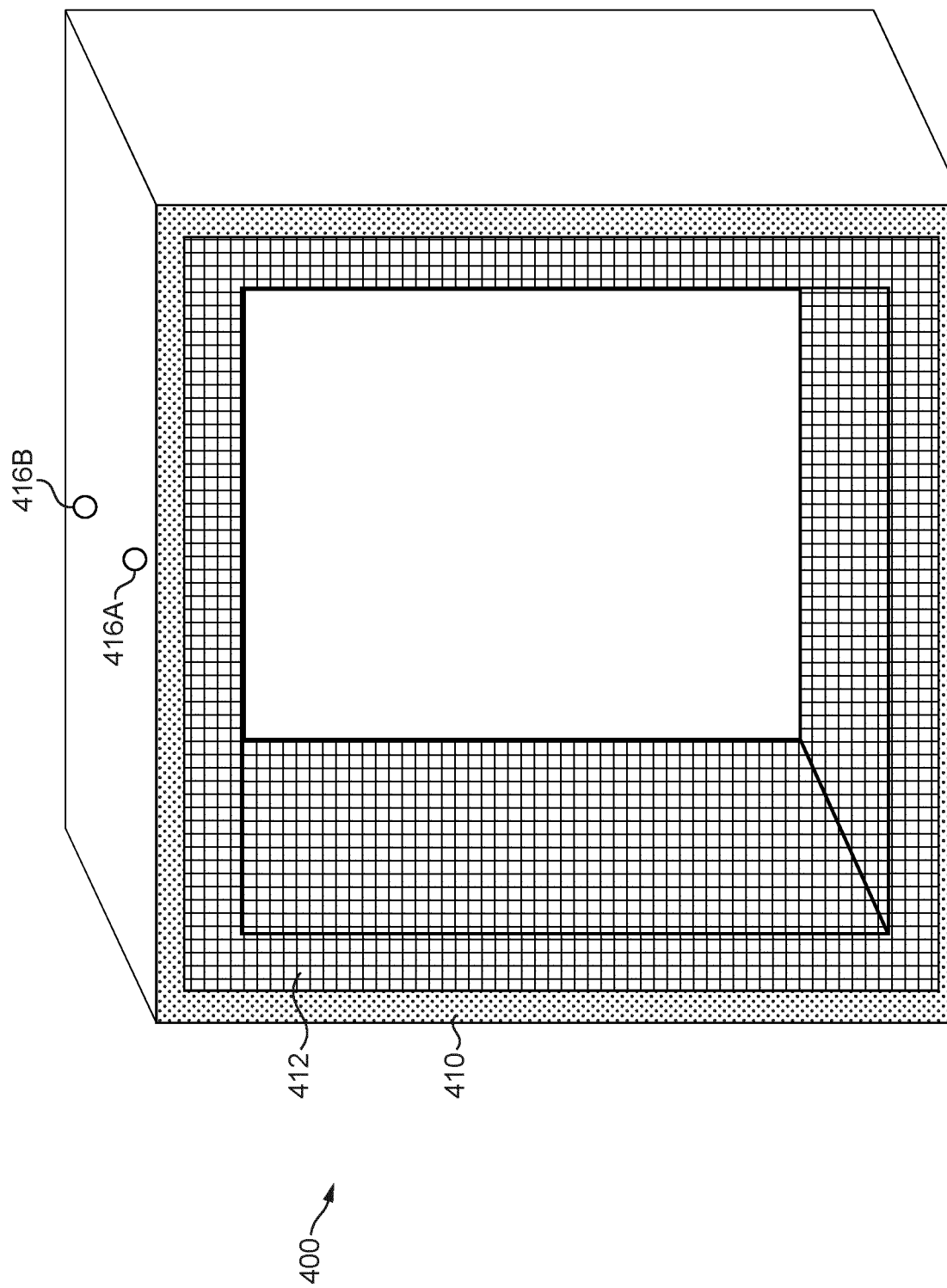
FIG. 3 shows a crush can comprising an outer frangible portion layered over an inner non-frangible portion and fixing aperture.

FIG. 3 shows a composite crush can 400 in an embodiment of the present disclosure, that is suitable for use as part of an energy management system as shown in FIG. 1. It will be understood that composite crush cans 400 can be used in an energy management system as shown in FIG. 1, replacing each of the crush cans 102A, 102B shown in FIG. 1, and that the crush cans 400 may be attached to a vehicle body 2000 and a bumper beam 106 via bolts passing through spigots on the vehicle body and the bumper beam, in the same manner as described with respect to FIG. 1.

The crush can 400 comprises a frangible outer layer 410, a non-frangible inner layer 412 and respective fixing apertures 416A, 416B at opposing ends of the crush can. The fixing apertures 416A, 416B must extend through the non-frangible layer 412, such that if the frangible layer is destroyed or shattered during a crash event, the non-frangible layer will remain intact and hold the bumper beam in position. Although only one fixing aperture is shown at each end in FIG. 3, it will be understood that in some embodiments plural fixing apertures may be provided.

Both the frangible layer and the non-frangible layer comprise a plurality of fibres embedded within a polymeric resin. In the illustrated embodiment, the frangible layer comprises carbon fibres embedded within a resin, and the non-frangible layer comprises ultra-high-molecular-weight polyethylene fibres embedded within the same resin. Suitable ultra-high-molecular-weight polyethylene fibres may be commercially available under the trade name Dyneema®.

Figure 4:
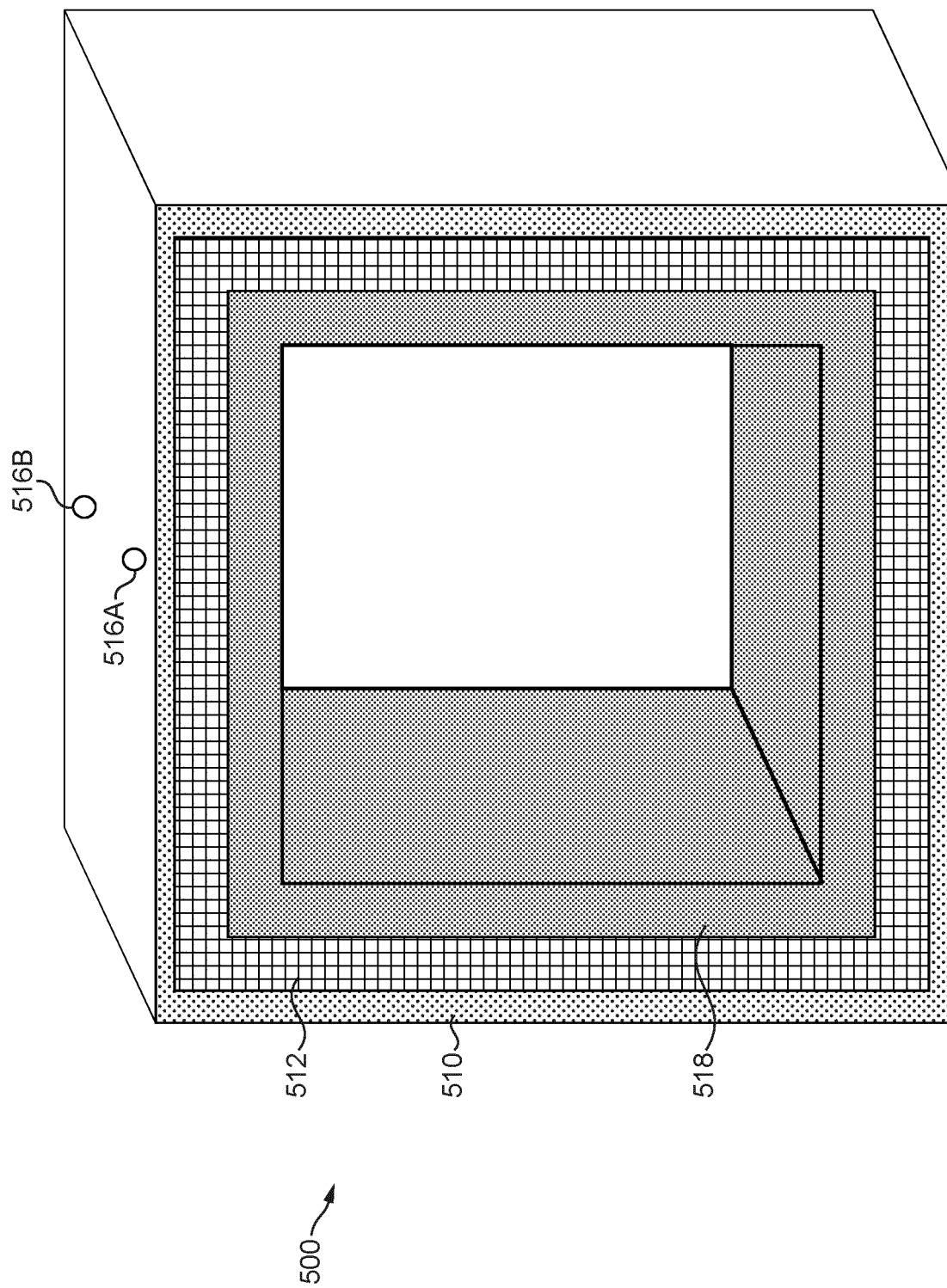
FIG. 4 shows a crush can with a plurality of layered frangible portions and at least one layered non-frangible portion and fixing aperture.

FIG. 4 shows a further embodiment of the present disclosure wherein the crush can 500 comprises three portions, outer 510, middle 512 and inner 518 layers as well as respective fixing apertures 516A, 516B at opposing ends of the crush can. In the embodiment shown in FIG. 4 the middle layer 512 is non-frangible and the inner and outer layers 510, 518 are frangible layers. Again, the frangible layers each comprise carbon fibres embedded within a polymeric resin. However, in this embodiment, the non-frangible portion comprises steel fibres embedded within the same resin as the carbon fibres. It will be understood that any number of frangible and non-frangible layers may be provided, and that various different types of fibres may be suitable for use in the frangible and non-frangible layers.

Figure 5:
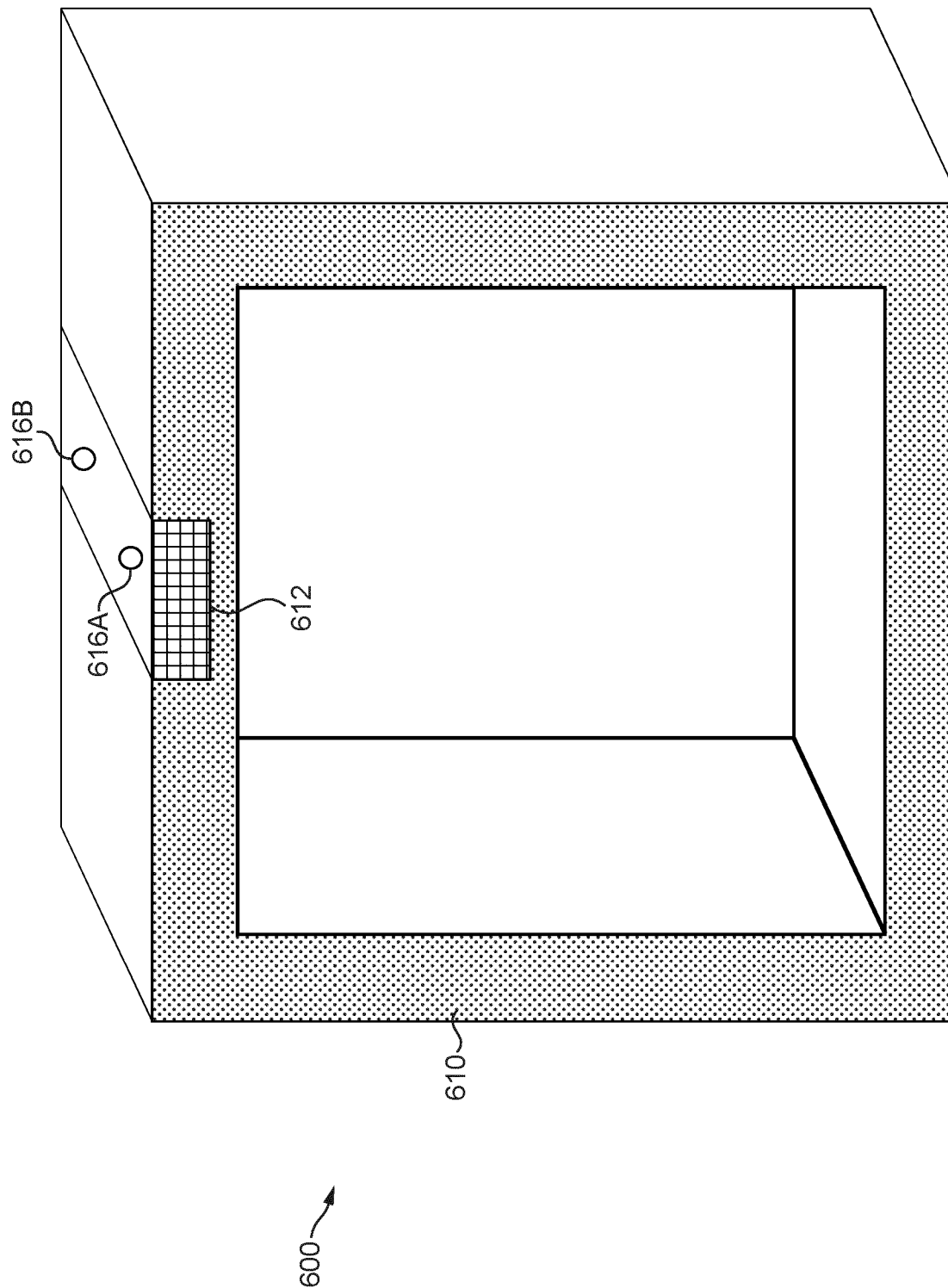
FIG. 5 shows a crush can comprising a frangible portion and a non-frangible portion and fixing aperture.

FIG. 5 shows a crush can 600 in a further embodiment of the present disclosure having a frangible portion 610 and a non-frangible portion 612. The non-frangible portion 612 comprises a strip and the frangible portion 610 makes up the rest of the crush can. The crush can would be connected to the bumper beam by the fixing aperture 616A which passes through the non-frangible portion and to the vehicle by fixing aperture 616B, both of which pass through the non-frangible portion 612. In this way, if the frangible portion was to disintegrate following a crash event, the non-frangible portion would remain intact and maintain the attachment of the bumper beam to the vehicle.

Figure 6:
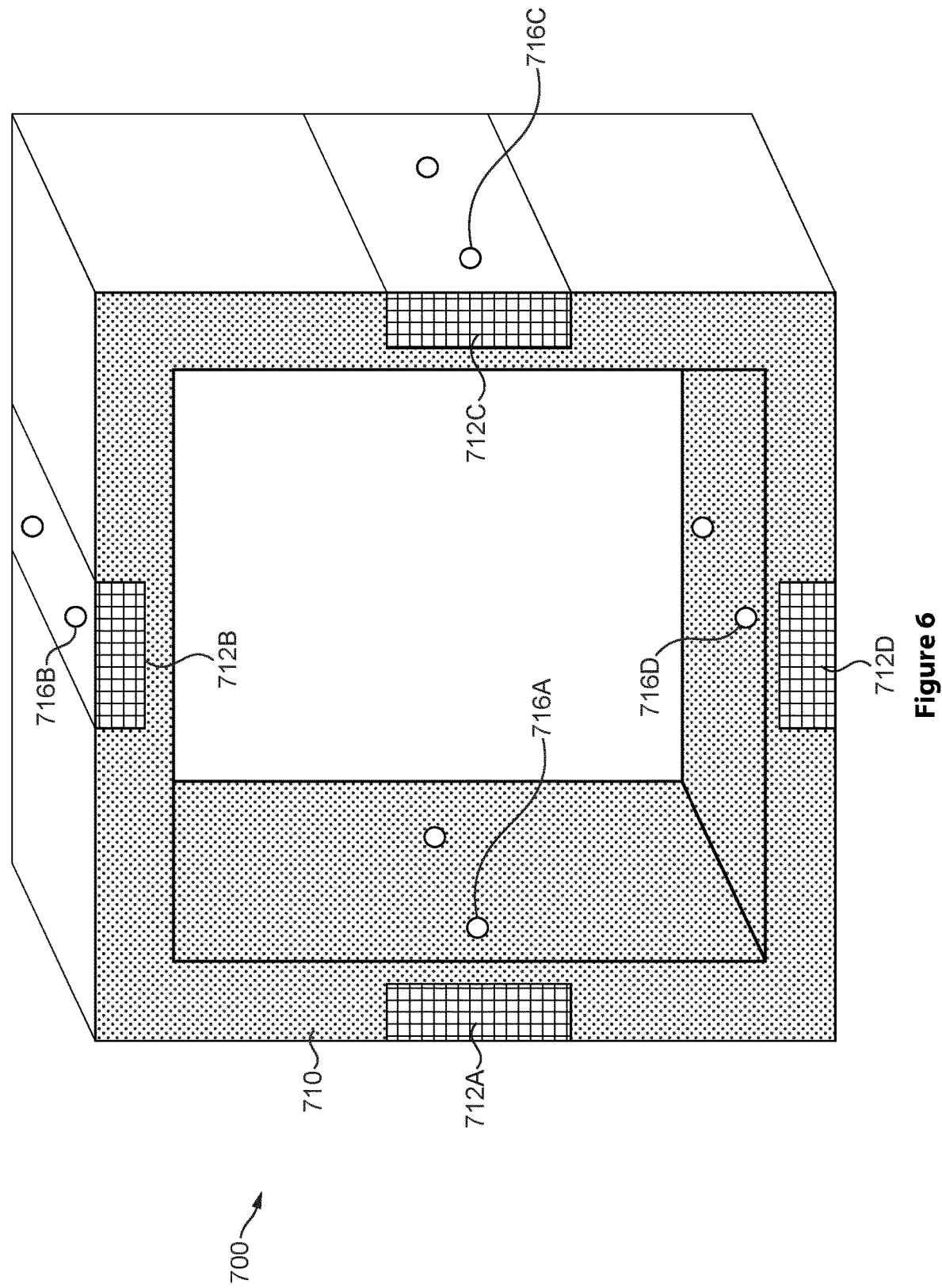
FIG. 6 shows a crush can comprising a frangible portion and a plurality of non-frangible portions and fixing apertures.

FIG. 6 shows a further embodiment of the present disclosure similar to that shown in FIG. 5, comprising a frangible portion 710 but wherein there are four non-frangible portions which comprise strips on the exterior of the crush can 700. The non-frangible strips 712A-D and their respective fixing apertures 716A-D may be located in optimised positions for weight and load distribution. In the embodiment shown each fixing aperture passes through one of the non-frangible portions, thereby providing four separate portions that maintain attachment of the bumper beam to the vehicle following a crash event.

It will be understood that in each of the embodiments shown in FIGS. 3-6 the non-frangible layer may comprise any suitable fibres that will not fracture in a high-energy crash situation. For example, and without intending any limitation, the non-frangible layer shown in FIGS. 3-6 may comprise fibres selected from: metal fibres, ultra-high-molecular-weight polyethylene fibres, glass fibres, aramid fibres, or polypropylene fibres. Alternatively, the non-frangible layer may comprise one or more metal strips. The fibres or strip may be embedded within any suitable resin, for example a polymeric resin. Furthermore, the non-frangible portion may comprise a plurality of distributed threads within the matrix of the composite material, provided that sufficient threads are provided to ensure that the fixing apertures remain sufficiently intact and connected to each other to maintain the attachment of the bumper beam to the vehicle following a crash.

Similarly, in the embodiments shown in FIGS. 3-6, the frangible layer may comprise any suitable frangible fibres embedded within a resin. For example, the frangible fibres may comprise carbon fibres, aramid fibres, plastic fibres, basalt fibres, glass fibres or natural fibres such as flax, jute or hemp fibres. In any event, the frangible fibres will generally be of lower weight than the non-frangible fibres, so it is generally preferred to use the frangible fibres for as large a proportion of the crush can as possible.

Although the non-frangible portion can be integrally moulded with the frangible portion, for example by embedding the non-frangible portion within the same matrix as the one or more frangible portions, it is also within the scope of the present disclosure to provide a separate part to act as the non-frangible portion. For example a non-frangible sheath may be provided around the crush can. Such a sheath may be connected to the vehicle and the bumper beam via the same fixing apertures as the crush can.

As will be discussed in more detail below, manufacture of a crush can having a prismatic section and a plurality of layers each comprising fibres embedded within a polymeric resin as shown in FIGS. 3-6, may be performed by a pultrusion process. Such a pultrusion process may result in a layer structure comprising a plurality of discrete strands. The pultrusion process uses continuous fibres which can be orientated in a pultrusion direction. The aligned fibres give a high tensile strength and compression in the pultruded direction, in comparison to randomly orientated fibres The fibres may optionally be oriented in other directions, if required.

Figure 7:
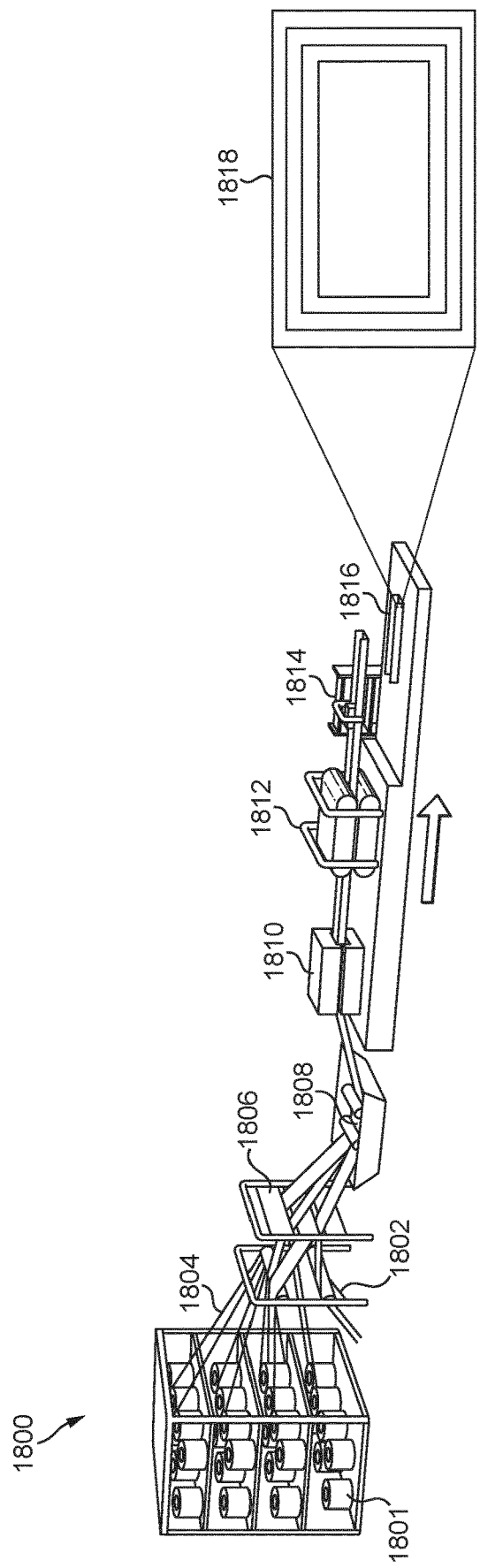
FIG. 7 shows a method of forming pultruded parts.

FIG. 7 shows a method of making a composite crush can 1818 comprising several layers of various materials, using a known pultrusion apparatus.

The pultrusion apparatus 1800 comprises a creel 1801 holding various spools of materials which are pulled as individual strands 1804 by a pulling system 1812, through guide plates 1806 and into a resin bath 1808 in which the individual stands are coated with resin. The strands are then pulled through a heated die 1810 which compresses the strands to form the coated strands into a desired shape. After the pultrusion (or pultruded profile) passes through the pulling system 1812, a cutting tool 1814 is used to cut the composite pultruded profile into appropriate lengths. It will be understood that the spools of material held on the creel 1801 as well as the further reinforcing materials 1802 may be different from one another, and that the spools may therefore be arranged such that the completed crush can comprises discrete layers, and the fibre used in each layer can be selected by the operator. Accordingly, the system shown in FIG. 7 can be used to create pultruded profiles 1816 having prismatic sections and a plurality of layers including at least one non-frangible layer including non-frangible fibres and at least one frangible layer comprising frangible fibres, as shown in FIGS. 3-6. The non-frangible parts can be included as part of the moulding process. As a result, the pultruded part may comprise two or more different materials.

Figure 8:
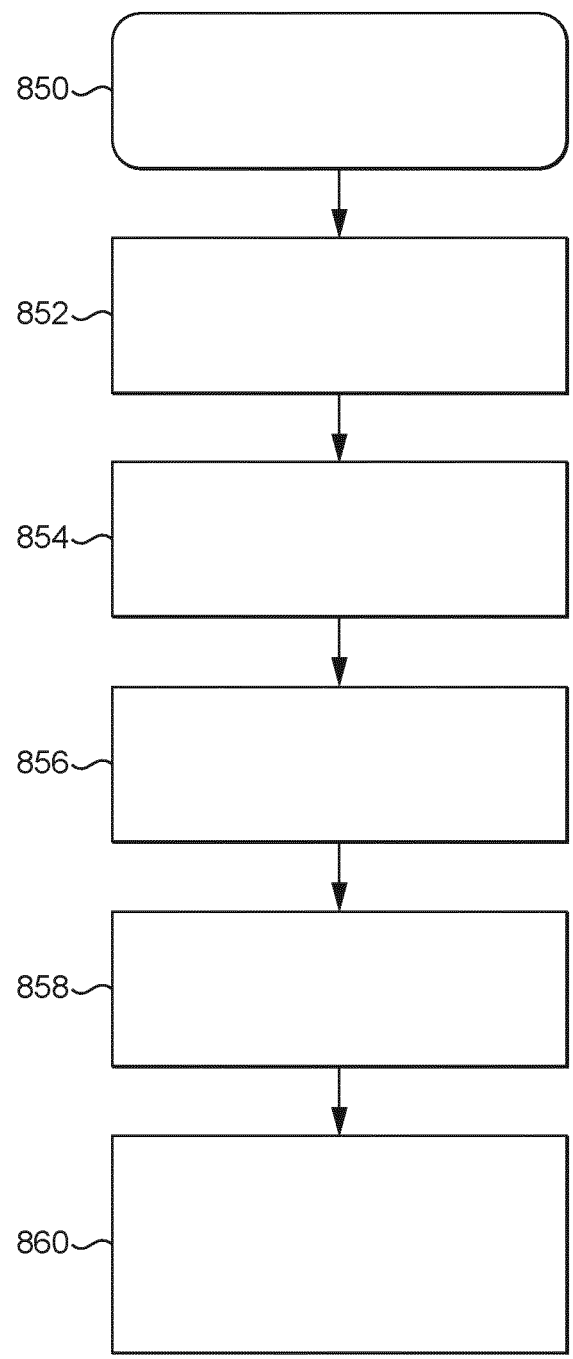
FIG. 8 shows a flowchart for a method of forming a crush can by pultrusion.

FIG. 8 shows a flowchart of the method of making a crush can by a pultrusion process. The pultrusion process is typically continuous rather than batch, so the flow chart shows the steps in the continuous process starting at block 850. The first step 852 is to pull individual strands of fibre from spools. A pulling machine is used to keep the strands under tension at all times. The arrangement of the spools, in terms of location relative to each other and the pultruding equipment, can determine the arrangement of the fibres in the final pultruded profile, with the shape being determined by the die. In the next step 854, the strands are pulled through a guide plate which can form the fibres into one or several bundles. In the next step 856 the bundles are then pulled into a liquid resin bath which saturates the bundles, usually with a heat-cured resin, although other forms of resin are also possible. In the next step 858 the bundles are pulled into a heated die which cures the resin whilst the bundles are compressed into the desired shape profile. In some embodiments, the heated die could be a die containing a light bath for curing the resin with UV light, although it will be understood that other forms of die which could be used to cure a resin could also be used. A pultruded profile is pulled out of the die, through the pulling machine, which then pushes the completed profile towards a cutting machine. The final step 860 is to cut the pultruded profile into an appropriate length such that it forms a crush can.

It will be understood that some of the strands may comprise frangible fibres, and some of the strands may comprise non-frangible fibres. In this way, a pultrusion comprising frangible and non-frangible portions can be produced in a single pultrusion process, thereby reducing the manufacturing cost of the completed crush can.

Figure 9:
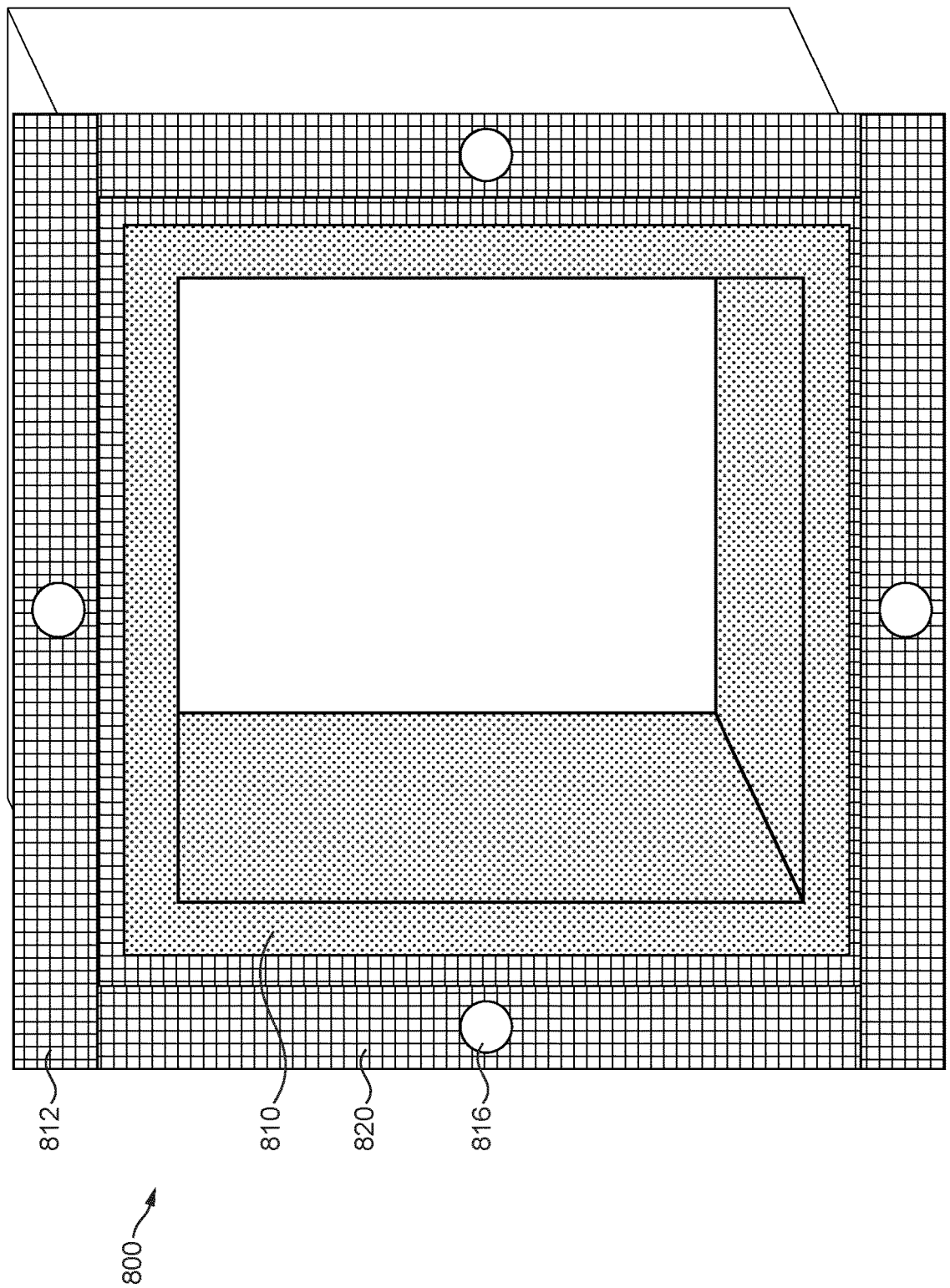
FIG. 9 shows a crush can with an inner frangible portion and a layered non-frangible outer portion, which is flanged with fixing apertures located in the flanged portion.

FIG. 9 shows a further embodiment of the present disclosure wherein the non-frangible portion 812 forms the outer layer of the crush can and the frangible portion 810 forms the inner layer. The end of the non-frangible portion is extended such that there is an attachment flange 820 comprising fixing apertures 816 around the perimeter of the crush can. Accordingly, the fixing apertures pass through the non-frangible layer. FIG. 9 only shows the one side of the crush can being flanged, but the crush can may be flanged at both ends. It will be understood that it may not be possible to create the non-prismatic section shown in FIG. 9 using the pultrusion apparatus shown in FIG. 7. Accordingly, an alternative method of manufacture such as moulding sections of pre-impregnated material (prepreg) may be used to create a crush can as shown in FIG. 9. It will be understood that a prepreg may be provided for each layer, and the structure of the fibres within the layers may be the same or different in each layer, dependent on the layer structure in each of the prepregs. For example, the layers may comprise a plurality of discrete strands, or a woven structure such as a net.

Figure 10:
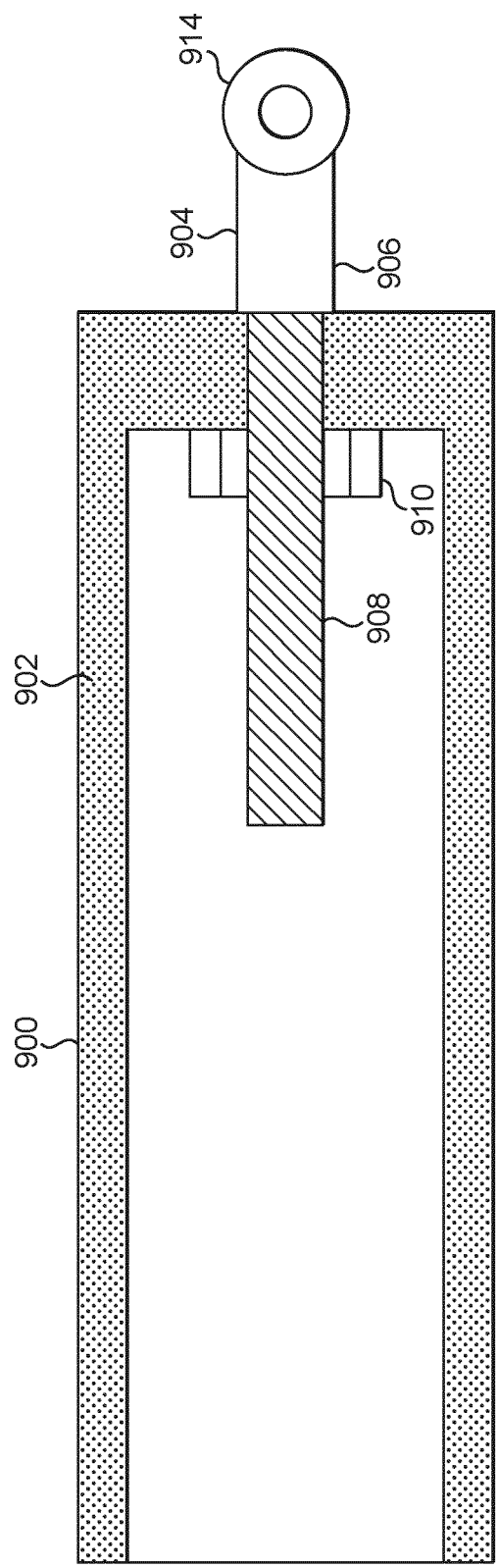
FIG. 10 shows a component comprising a crush can having an internal moulded structure and attached towing eye.

FIG. 10 shows a further embodiment of the present disclosure, a component 900 comprising a crush can having a moulded internal structure 902. It will be understood that the component 900 retains its function as a crush can, and may therefore still be referred to as a crush can. In the illustrated embodiment, the moulded internal structure 902 is configured to accept and secure a towing eye 904. As discussed above, it is known for prior art energy management systems to include a metal insert within one or both of the crush cans configured to receive a towing eye. Typically, the towing eye may be configured to screw into an insert within the crush can. The towing eye 904 may be provided to tow the vehicle, for example in a recovery situation. Alternatively, or in addition, the towing eye 904 may be used to secure the vehicle during transit, for example during ocean transportation of the vehicle. Alternatively, or in addition, the towing eye 904 may be provided for mounting or attachment of an accessory, such as a transportation rack for one or more bicycle.

In the embodiment shown in FIG. 10, the towing eye is formed of metal such as steel, and the crush can and internal structure 902 formed of a composite material. Specifically, the internal structure 902 is formed from sheet moulding compound comprising a polymeric matrix having a plurality of short, randomly-orientated fibres encased therein. Because the internal structure 902 is formed from a composite, the problem of galvanic corrosion occurring where the towing eye meets the insert is effectively mitigated, as galvanic corrosion is unlikely to occur at interfaces between a metal and a polymer-based composite including non-carbon fibres. In embodiments in which carbon fibres are used, galvanic corrosion may be mitigated by using stainless steel as the metal part, or coating the metal part with stainless steel. The crush can may be a composite crush can produced in accordance with one or more embodiments of the present disclosure, as described above with respect to FIGS. 1-9.

Providing a moulded structure within a composite crash can provide a convenient and strong way of attaching the towing eye to the crush can, potentially with no need to provide adhesive or additional fixings between the crush can and the internal structure. Furthermore, it enables all of the components of the crush can apart from the towing eye itself to be made from composite materials, thereby reducing the overall mass of the energy management system.

In the embodiment shown in FIG. 10, the towing eye 904 comprises a threaded shank 908 having shoulder 906 at an end thereof. Shoulder 906 is configured to abut an end of the internal structure 902 when the threaded shank is fully inserted into the aperture in the internal structure 902. A nut 910 is then placed onto the threaded shank to secure the towing eye to the internal structure 902. The towing eye 904 facilitates connection to a towing vehicle or an anchor point via towing ring 914. An attachment point for a bicycle rack may also be provided in place of the towing eye.

Although the internal structure 902 is configured to support a towing eye in the embodiment shown in FIG. 10, it will be understood that the internal structure may also perform other functions. For example, the internal structure 902 may selectively reinforce the crush can. Indeed, in the event that only one of the crush cans within an energy management system comprising two crush cans connected to a bumper beam is provided with a towing eye, it may in any event be necessary to provide moulded internal structures 902 within both of the cans, so as to ensure substantially similar energy absorption between the two cans.

Figure 11:
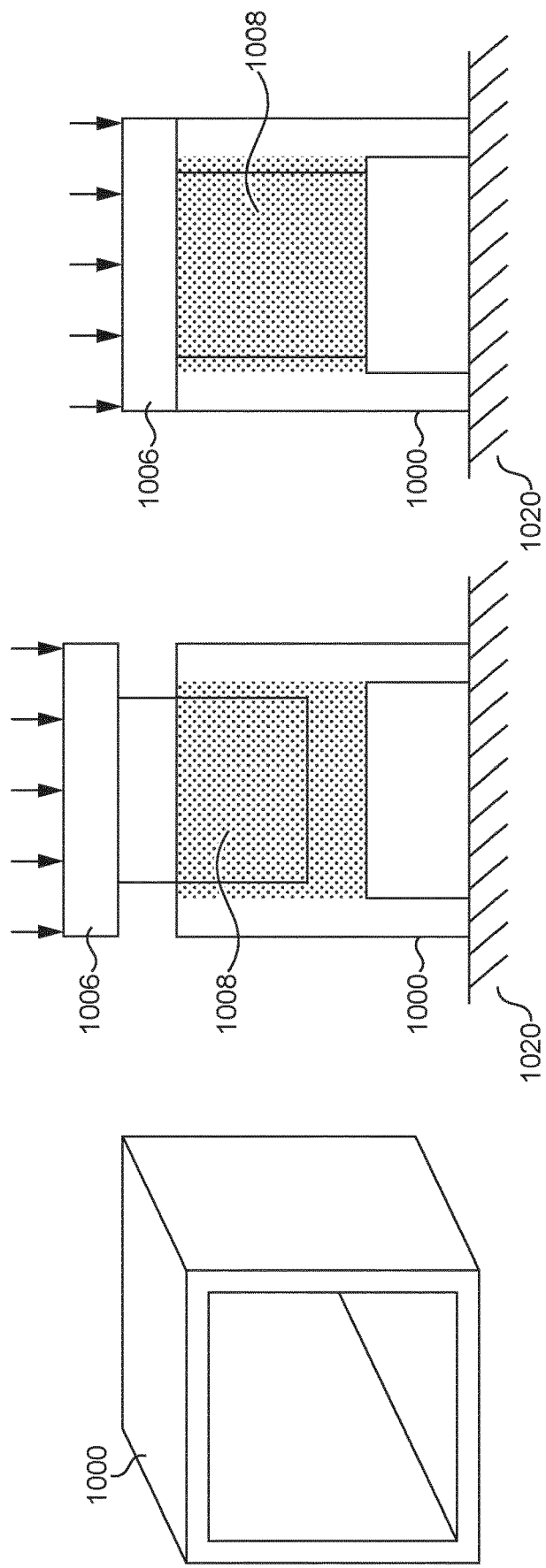
FIG. 11 shows a method of manufacturing a crush can comprising using the internal features of the crush can as one surface of a mould.

FIG. 11 shows a method of making a crush can 1000 with an internal moulded feature (structure) in accordance with an embodiment of the present disclosure. The first step involves making a hollow crush can that is open at both ends. In the illustrated embodiment, the crush can is a composite crush can that has a prismatic structure, including at least one layer of non-frangible fibres embedded within a polymeric matrix. The crush can 1000 may be made using the pultrusion process illustrated in FIG. 7, and the layers may be configured in the manner shown in any one of FIGS.

3-6. However, it will be understood that the precise configuration of the crush can may be incidental, and that various different composite or non-composite crush cans may be used in other embodiments of the present disclosure.

Figure 13:
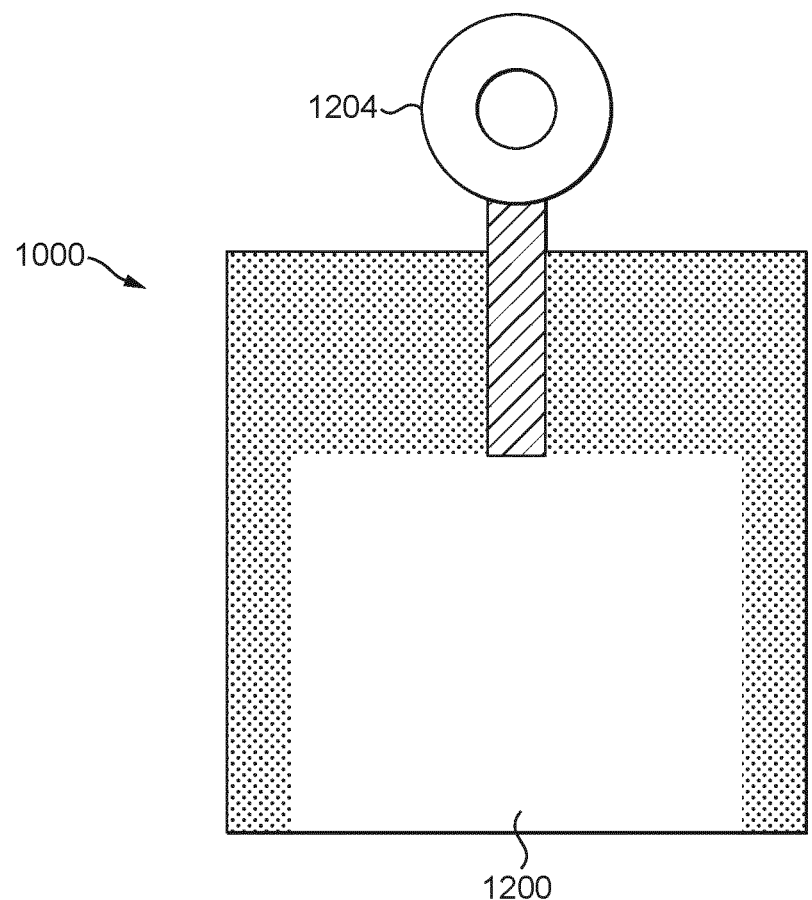
FIG. 13 shows a completed crush can made according to FIG. 11 further comprising a towing eye.

An open end of the substantially hollow crush can 1000 is placed onto a mould surface 1020, which may be provided with means to hold the crush can in place and/or to support the walls of the crush can during the moulding process (not shown). A charge of fibre-reinforced material 1008 is then placed into the crush can via the other opening, such that the internal structure of the crush can and the mould surface 1020 forms a mould cavity. A punch tool mould 1006 is then inserted into the mould cavity via the opening in the crush can, to compress the fibre-reinforced material such that it forms the desired shape. After curing of the moulded composite material from charge 1008, the mould 1006 is then removed, leaving the fibre-reinforced material in the desired shape and thereby producing the internally-moulded portion 1200 (e.g., shown in FIG. 13). In certain embodiments, the internally-moulded portion 1200 may comprise an internal structure of the type described herein. As shown in FIG. 13, the internally-moulded portion 1200 may be suitable for mounting a towing eye 1204.

Figure 12:
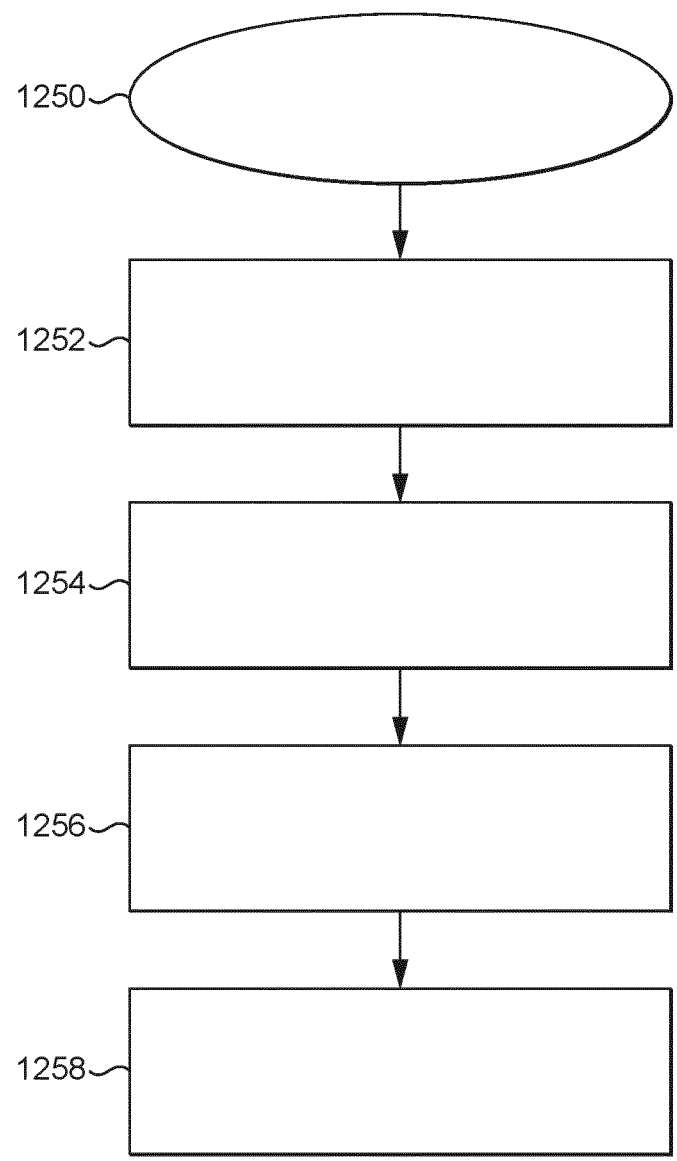
FIG. 12 shows a flowchart for a method of making a crush can with an internal moulded structure.

FIG. 12 is a flowchart of a method of making a crush can with an internal moulded structure starting at block 1250. The first step at block 1252 is to provide a substantially hollow crush can. The substantially hollow crush can may be formed of composite materials, and may be a crush can as described above with respect to any one of FIGS. 1-9.

The next step at block 1254 is to insert a fibre reinforced material into the substantially hollow crush can. The fibre reinforced material may be a sheet moulding compound. The final net shape of the moulded structure to be produced may be used to calculate the volume of material required. The crush can may be held in position and could also be heated depending on the material used.

The next step at block 1256 is to mould the fibre reinforced material using the internal structure of the substantially hollow crush can and at least one part of a split mould. The further part of the split mould may be pressed into the fibre reinforce material using any known technique such as a hydraulic press. The further part or pasts of the split mould may be formed such that when they compress the fibre reinforced material it forms a shape as designed by an optimisation process which takes into account the various loads that the internal structure is likely to be subjected to over its lifespan.

The final step 1258 includes curing the fibre reinforced material and removing the split mould. The method of curing will depend on the fibre reinforced material being used, but may include heating, cooling, light exposure, chemical means or any other known method.

FIG. 13 shows the completed crush can 1000 shown in FIG. 11, with a towing eye 1204 inserted into the internally-moulded portion 1200.

Figure 14:
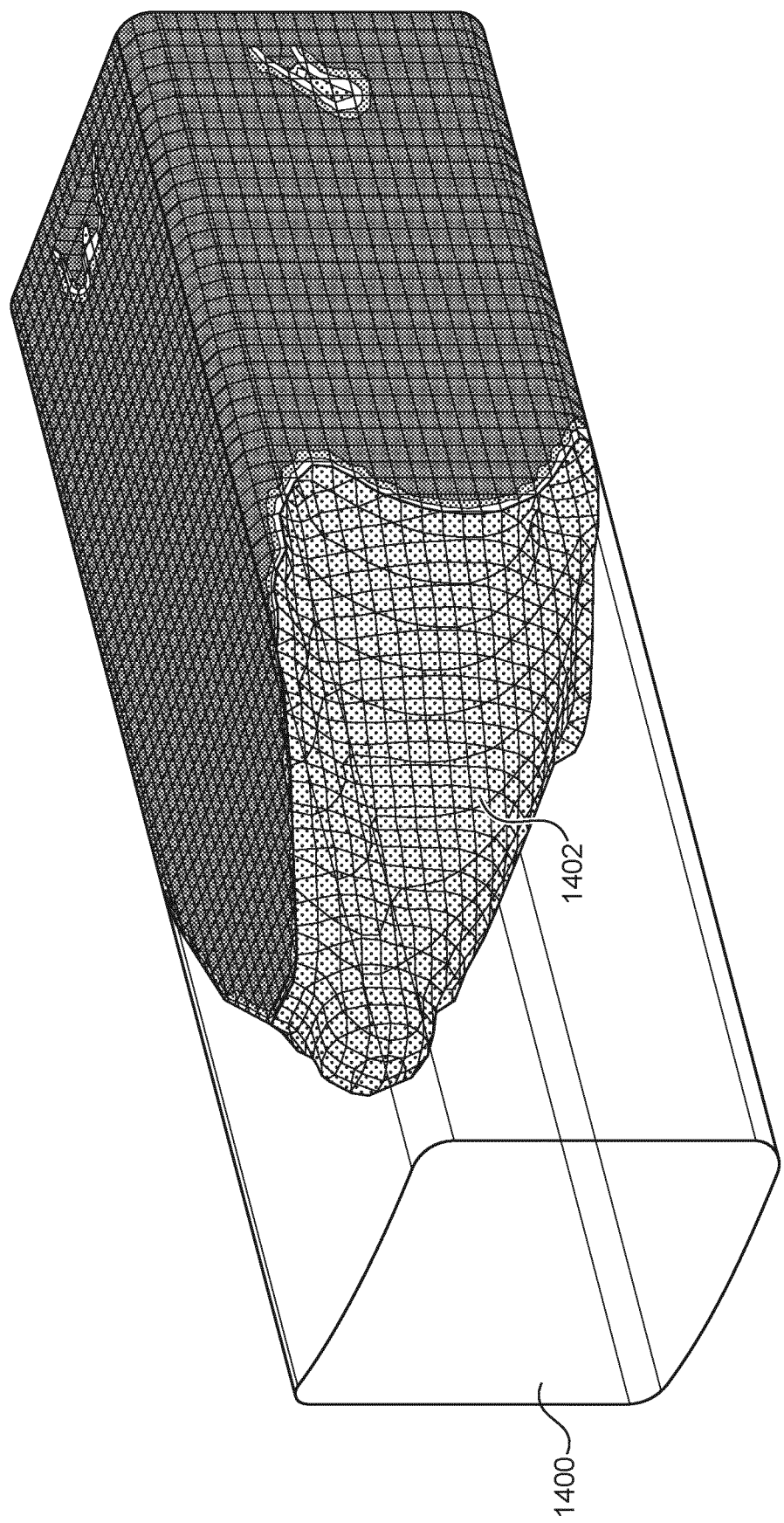
FIG. 14 shows a computer aided design model of a crush can comprising an optimised internal moulded feature.

FIG. 14 shows a component comprising a crush can 1400 having an internal moulded structure 1402 in another embodiment of the present disclosure. In the illustrated embodiment, the crush can 1400 is produced by a pultrusion method as described above, and comprises a plurality of layers including one or more frangible layers and at least one non-frangible layer. It will be understood that, because the surface of the internal moulded structure 1402 does not coincide with the opening in the crush can 1400, it is necessary to provide an additional mould part within the crush can 1400 to define the surface of the moulded structure 1402 before inserting the charge of material such as sheet moulding compound into the crush can. A punch tool is then inserted into the crush can 1400 to form the charge of material into the desired shape, as described above with respect to FIG. 11.

Only the outline of the crush can is shown, so that the internal moulded structure 1402 is visible. The shape of the moulded structure 1402 has been optimised by modelling the stresses that will be applied to the moulded structure by the towing eye when it is under load. For instance, the towing eye is expected to be subjected to loads that occur when the towing eye is used as an anchor point during transportation of the vehicle (for example on a ship or a truck), when a bike rack is connected using the same interface as the towing eye or when the towing eye is used in recovery of a vehicle that needs mechanical attention. The structure shown has been optimised to minimise weight whilst meeting a requirement that the towing eye interface might be subjected to a shock acceleration of 11G when a loaded bike carrier is attached, and also for the loads expected during towing and transport of the vehicle. However, it will be understood that other load cases could be used in other embodiments.

Figure 15:
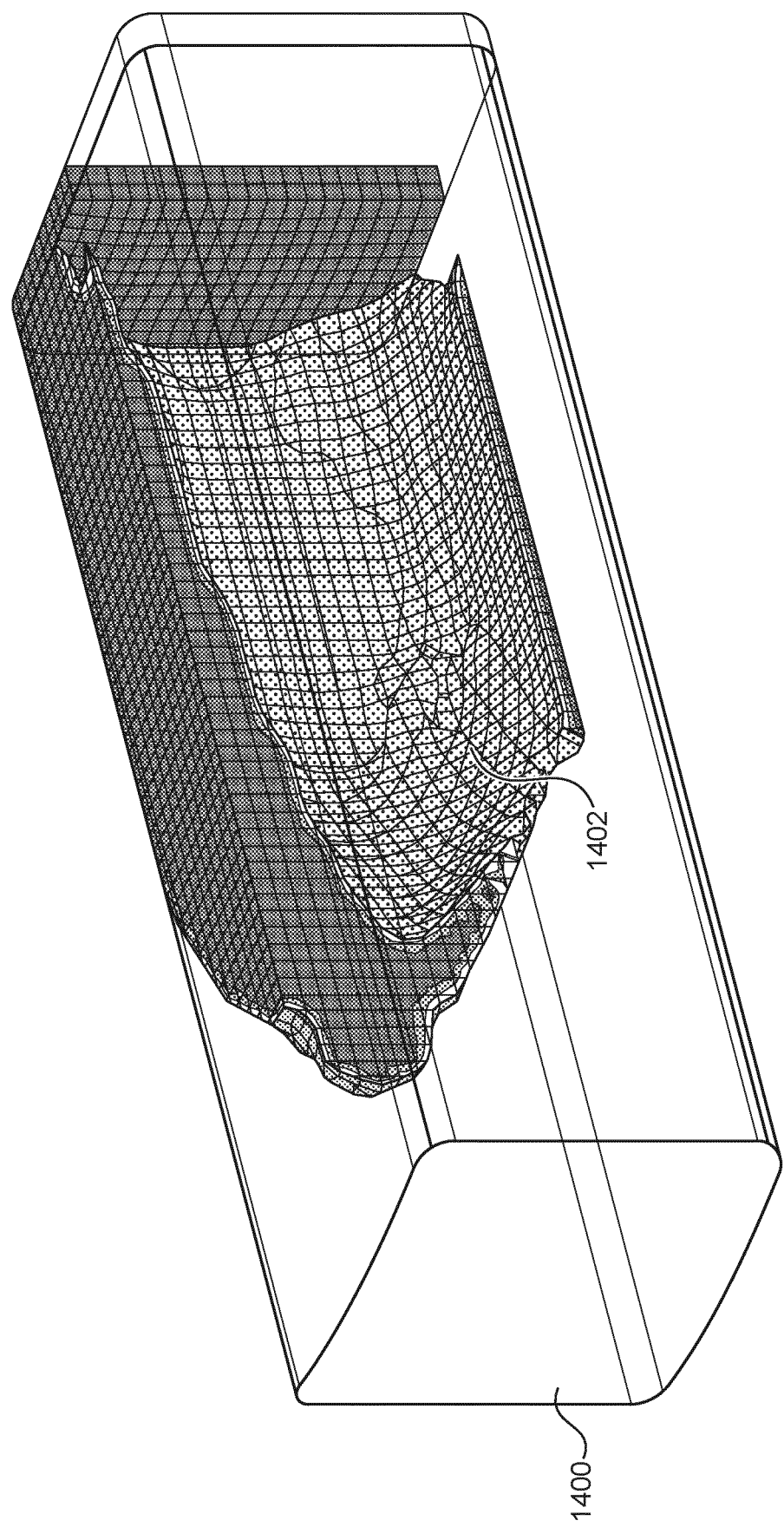
FIG. 15 shows a computer aided design model of a crush can comprising an optimised internal moulded feature.

FIG. 15 shows the crush can 1400 from FIG. 13, and an internal moulded structure 1402, showing a cross section through the internal structure 1402, and again showing only the outline of the crush can 1400. The optimised internal structure of the internal moulded structure is there visible in FIG. 14. The cross section highlights the benefit of using sheet moulding compound when moulding, which allows for thickness variation of the internal structure 1402.

Figure 16:
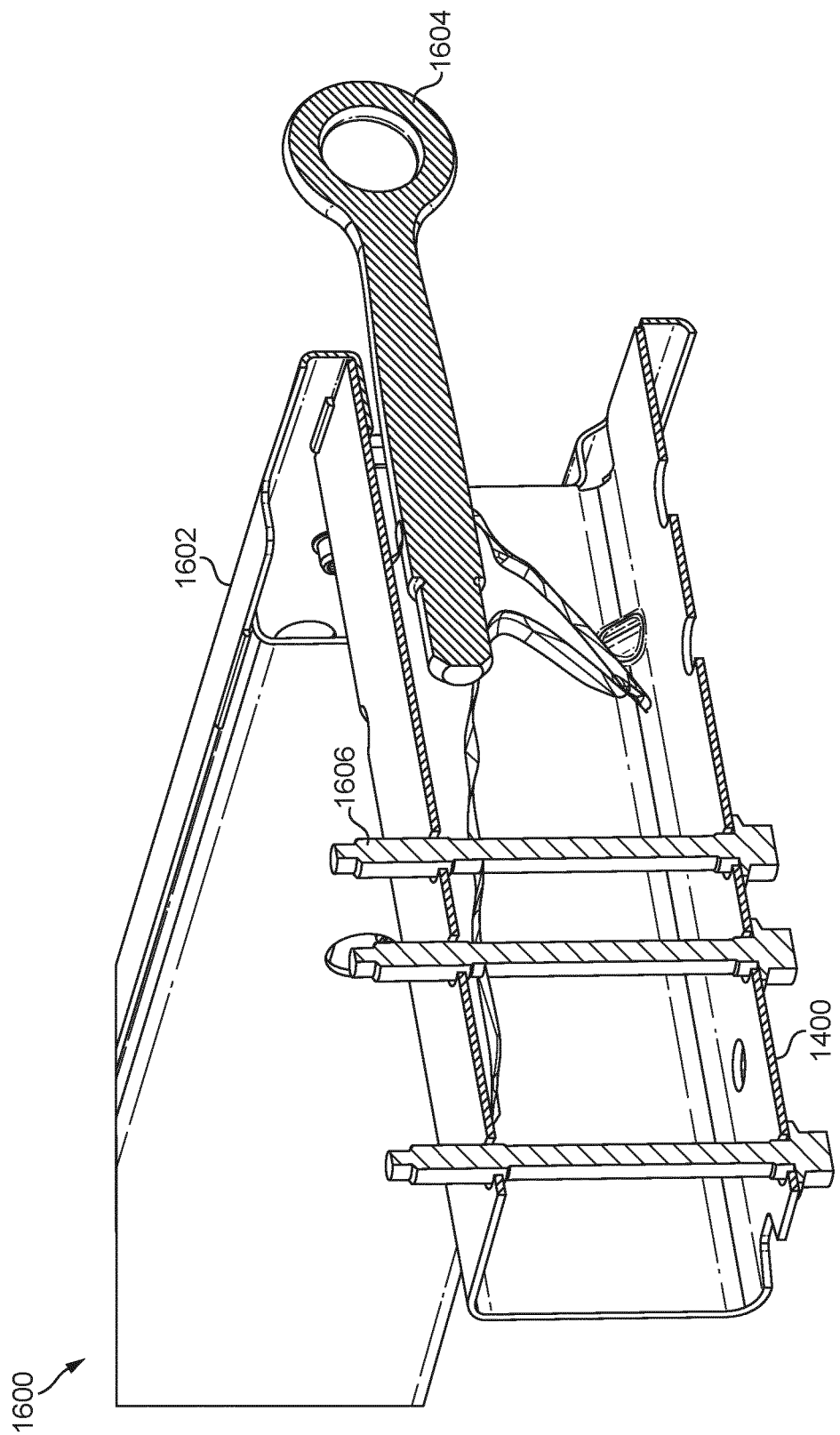
FIG. 16 shows a computer aided design model of a crush can comprising an optimised internal moulded feature.
Figure 17:
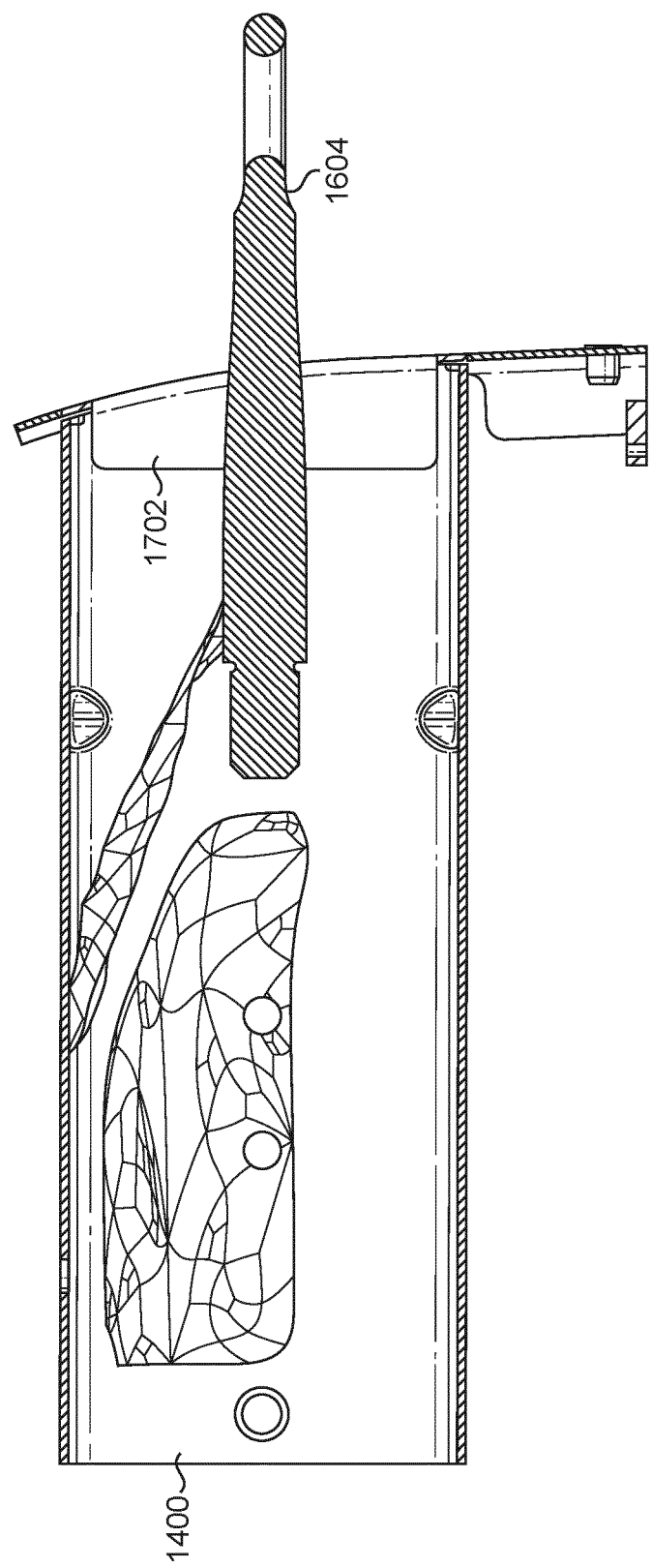
FIG. 17 shows a computer aided design model of a crush can comprising an optimised internal moulded feature.

FIGS. 16 and 17 show part of an energy management system 1600 comprising a crush can 1400 having an internal moulded structure 1402 as shown in FIGS. 14 and 15, in combination with a bumper beam 1602 and a towing eye 1604 attached to an end of the internal moulded structure. The crush can is attached to the body of the vehicle (not shown) via bolts 1606. The bumper beam 1602 is also attached to the crush can via bolts (not shown). It will be understood that at least one of the bolts attaching the crush can to the vehicle body, and at least one of the bolts attaching the crush can to the bumper beam, may pass through the non-frangible layer of the crush can. As described above, this ensures that the bumper beam remains attached to the vehicle body following a crash event. FIG. 17 shows a cross section through the energy management system 1600, in which a composite flange 1702 is also visible. The composite flange 1702 helps to secure the position of the towing eye within the crush can and reduces the stress applied to the mounting point by reducing the moment created by the mass overhang. Although the composite flange is shown as a separate part in the illustrated embodiment, it is also possible for the composite flange to be moulded during the same process that forms the internal moulded structure.

The crush cans in the previous embodiments generally comprise a box-section, for example comprising a square, rectangular or polygonal profile (in transverse section). However, the present disclosure is not limited to this particular configuration. A composite crush can 1900 in accordance with a still further embodiment of the present disclosure will now be described with reference to FIGS. 18, 19 and 20.

Figure 18:
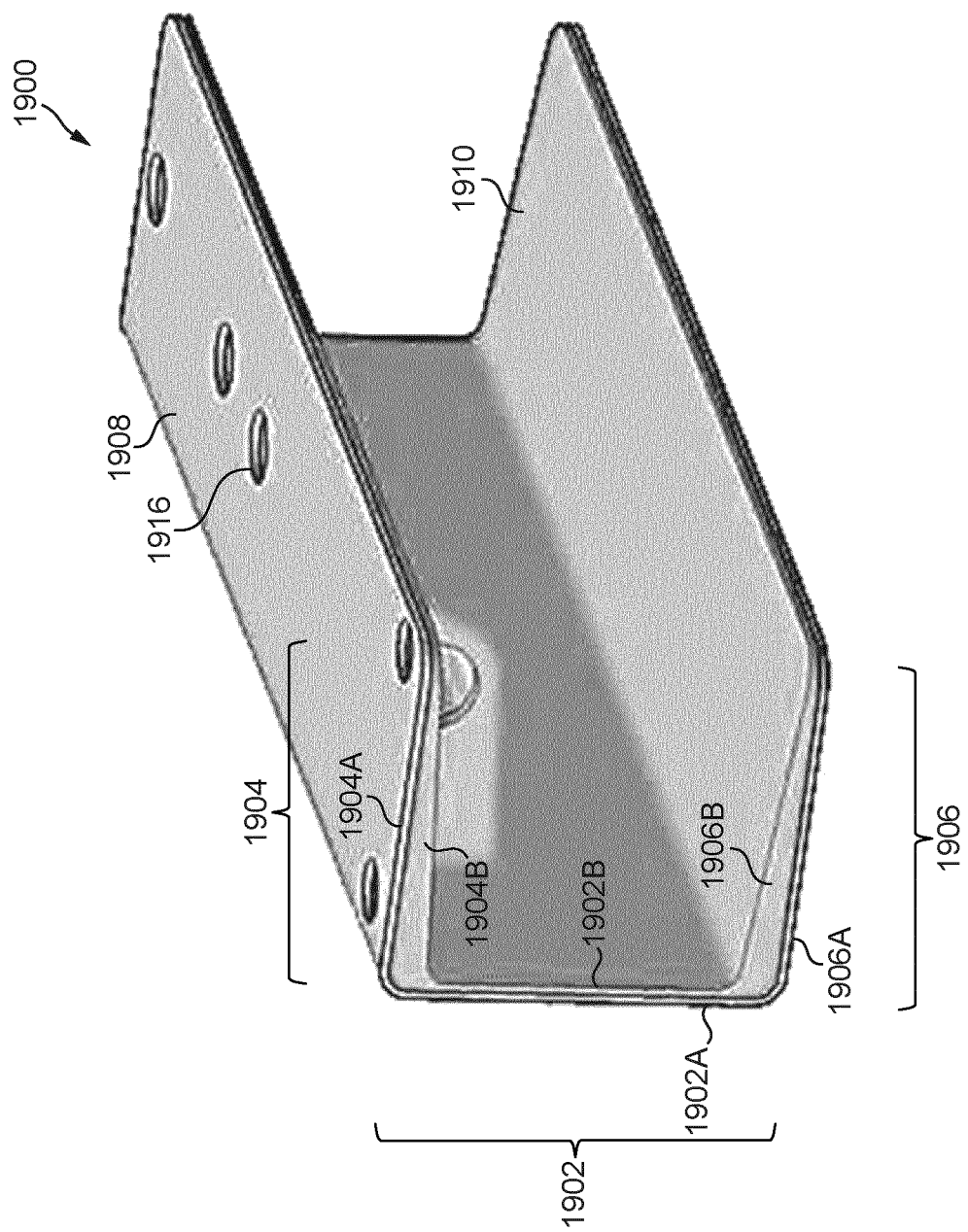
FIG. 18 shows a perspective view of a crush can according to a further embodiment of the present disclosure.

The crush can 1900 is suitable for use as part of an energy management system of the type shown in FIG. 1. As shown in FIG. 18, the crush can 1900 has a channel section comprising a central section 1902 and opposing first and second sidewalls 1904, 1906. The crush can 1900 in the present embodiment has a generally U-shaped profile. For instance, the first and second sidewalls 1904, 1906 extend substantially perpendicular to the central section 1902. It will be understood that the crush can 1900 may comprise different profiles. The first and second sidewalls 1904, 1906 could extend outwardly from the central section 1902 at an obtuse angle, for example to form a truncated V-shape. The first and second sidewalls 1904, 1906 may be the same length or may be different lengths. Alternatively, or in addition, the crush can 1900 may comprise a top-hat section in which one or both of the first sidewall 1904 and the second sidewall 1906 comprise a flange. A first flange (not shown) may be formed integrally at a distal end of the first sidewall 1904. Alternatively, or in addition, a second flange (not shown) may be formed integrally at a distal end of the second sidewall 1906.

The crush can 1900 comprises an outer portion 1908 and an inner portion 1910. As described herein, the inner portion 1910 forms an internal structure which is moulded inside the outer portion 1908. The outer portion 1908 and the inner portion 1910 in the present embodiment form respective outer and inner layers. Thus, the crush can 1900 has a dual-layer composition. The outer portion 1908 comprises a central outer section 1902A and first and second outer sidewalls 1904A, 1906A. The outer portion 1908 has a substantially uniform thickness. The inner portion 1910 comprises a central inner section 1902B and first and second inner sidewalls 1904B, 1906B. The central inner section 1902B comprises a substantially uniform thickness. The first and second inner sidewalls 1904B, 1906B comprise respective first and second tapered profiles. For instance, the thickness of the first and second inner sidewalls 1904B, 1906B decreases towards their respective distal ends. Thus, the inside surfaces of the first and second sidewalls 1904, 1906 are each inclined at an angle greater than 90° (an obtuse angle) relative to the inside surface of the central section 1902. In the present embodiment, the inside surfaces of the first and second sidewalls 1904, 1906 are each inclined at an angle of approximately 100° relative to the inside surface of the central section 1902.

In the present embodiment, the outer portion 1908 is non-frangible; and the inner portion 1910 is frangible. It will be understood that this arrangement may be reversed such that the outer portion 1908 is frangible; and the inner portion 1910 is non-frangible. Both the frangible portion and the non-frangible portion comprise a plurality of fibres embedded within a polymeric resin. The non-frangible portion comprises ultra-high-molecular-weight polyethylene fibres embedded within a resin. The frangible outer portion comprises carbon fibres embedded within a resin. Alternatively, the frangible fibres may comprise aramid fibres, plastic fibres, basalt fibres, glass fibres or natural fibres such as flax, jute or hemp fibres. The resin used to form the non-frangible portion and the frangible portion may be the same type or different types. Suitable ultra-high-molecular-weight polyethylene fibres may be commercially available under the trade name Dyneema®. The non-frangible portion may comprise a plurality of distributed threads within the matrix of the composite material, provided that sufficient threads are provided to ensure that the fixing apertures remain sufficiently intact and connected to each other to maintain the attachment of the bumper beam to the vehicle following a crash. In the event of a crash event, the frangible portion may be partially or completely destroyed or shattered. However, the integrity of the non-frangible portion will be at least partially maintained. Thus, the bumper beam may be held in position following the crash event.

The crush can 1900 comprises a plurality of fixing apertures 1916. The fixing apertures 1916 in the present embodiment are formed in the first sidewall 1904. It will be understood that one or more fixing apertures 1916 may be formed in the second sidewall 1906 and/or the central section 1902. In use, one or more mechanical fastener 1918 (shown in FIG. 19) are located in the fixing apertures 1916 to mount the crush can 1900. In the illustrated arrangement, the mechanical fasteners 1918 comprise bolts for removably mounting the crush can 1900. The mechanical fasteners 1918 mount the crush can 1900, for example to the body structure of the vehicle 2000. The mechanical fasteners 1918 also inhibit relative movement of the outer portion 1908 and the inner portion 1910. It will be understood that the number of fixing apertures 1916 and their position may be adjusted for different applications.

The outer portion 1908 is formed independently using an appropriate technique. For example, the outer portion 1908 may be pultruded using the pultrusion technique described herein with reference to FIG. 7. In a variant, the outer portion 1908 may be moulded, for example using a pre-impregnated material. The inner portion 1910 is moulded inside the outer portion 1908. The outer portion 1908 forms a mould (or part thereof) for forming the inner portion 1910. Thus, in the present embodiment, the inner portion 1910 constitutes a moulded internal structure. The inner portion 1910 may, for example, be compression moulded inside the outer portion 1908.

The outer portion 1908 is pre-formed and placed in a mould. The mould may hold the outer portion 1908 in place and/or support the first and second sidewalls 1904, 1906 during the moulding process. An interior of the outer portion 1908 forms a mould cavity for forming at least a portion of the inner portion 1910. A fibre-reinforced material is introduced into the outer portion 1908 for forming the inner portion 1910. The fibre-reinforced material may be introduced into the outer portion 1908 as a charge, for example. Alternatively, the fibre-reinforced material may be introduced as a sheet moulding compound. A mould tool (not shown) is introduced into the interior of the outer portion 1908 via the opening formed between the first and second sidewalls 1904, 1906. The mould tool compresses the fibre-reinforced material, thereby forming the inner portion 1910. An internal profile of the outer portion 1908 forms an exterior of the inner portion 1910; and an external profile of the mould tool forms an interior of the inner portion 1910. As shown in FIG. 18, the first and second sidewalls 1904, 1906 have a tapered profile such that their thickness decreases towards their outer edges (i.e. in a direction away from the central section 1902). Thus, the opposing inner surfaces of the first and second sidewalls 1904, 1906 are tapered outwardly. In transverse section, the interior of the crush can 1900 comprises a truncated triangle.

After curing of the moulded composite material, the mould tool is removed, leaving the fibre-reinforced material in the desired shape and thereby producing the integrally-moulded crush can 1900. The crush can 1900 may then be removed from the mould. The outer portion 1908 and the inner portion 1910 may bond to each other at the interface. One or more mechanical fasteners may be provided to limit relative movement of the outer portion 1908 and the inner portion 1910. The outer portion 1908 may optionally comprise one or more keyed or locking features, such as an aperture or negative return. The inner portion 1910 may engage the keyed or locking feature(s) to mechanically fasten the inner portion 1910 to the outer portion 1908.

In a variant, the outer portion 1908 may be moulded around the inner portion 1910. For example, the inner portion 1910 may be pre-formed and introduced into a mould cavity to form the outer portion 1908. An exterior of the inner portion 1910 may form an interior of the outer portion 1908. A fibre-reinforced material may be introduced into the mould cavity to form the outer portion 1908. The fibre-reinforced material may be introduced into the mould cavity before or after introduction of the inner portion 1910. For example, the inner portion 1910 may be introduced into the mould cavity to displace the fibre-reinforced material to the desired shape.

The U-shaped section of the crush can 1900 facilitates moulding of the inner portion 1910. For example, there is improved access to the interior of the outer portion 1908 which may enable the use of tooling consisting of a single mould part which may be introduced from one side. At least in certain embodiments, this may be less complicated than tooling for forming a box section of the type described herein which may require the use of two mould tools. The cost and complexity of tooling may be less than for crush cans having a box section. A further potential advantage is that the material usage (and weight) of the crush can 1900 is less than for an equivalent crush can having a box section. This saving may result from the improved ease with which a single draft angle can be formed to enable removal of the mould tool(s).

Figure 19:
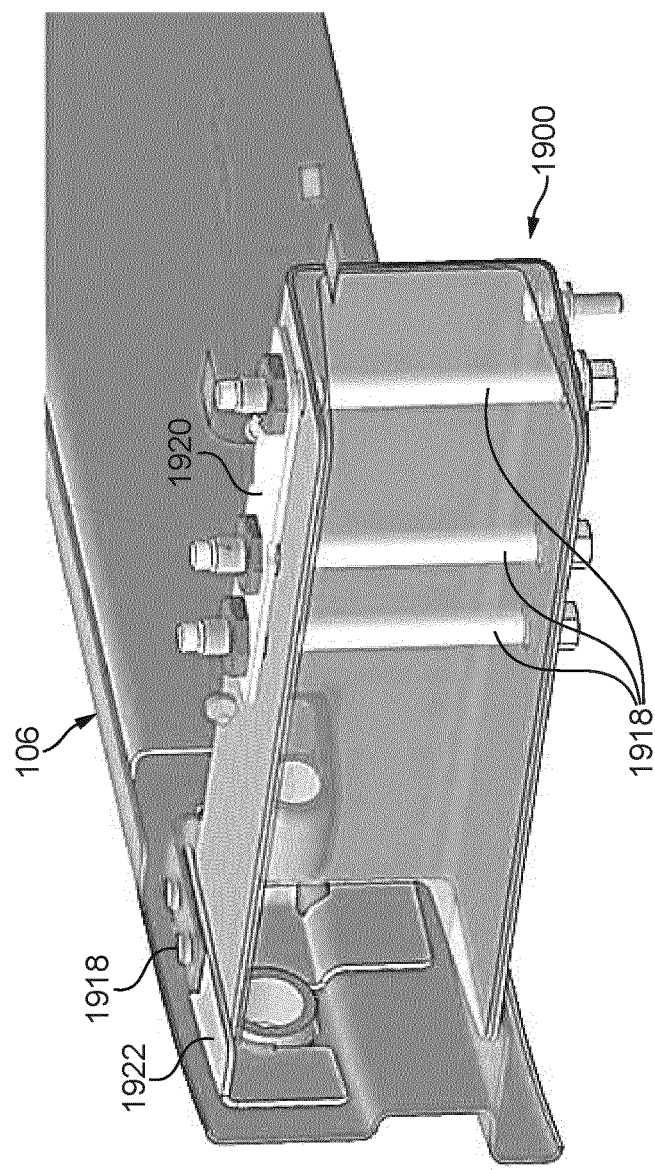
FIG. 19 shows a perspective view of the crush can shown in FIG. 18 mounted to a body structure of a vehicle.
Figure 20:
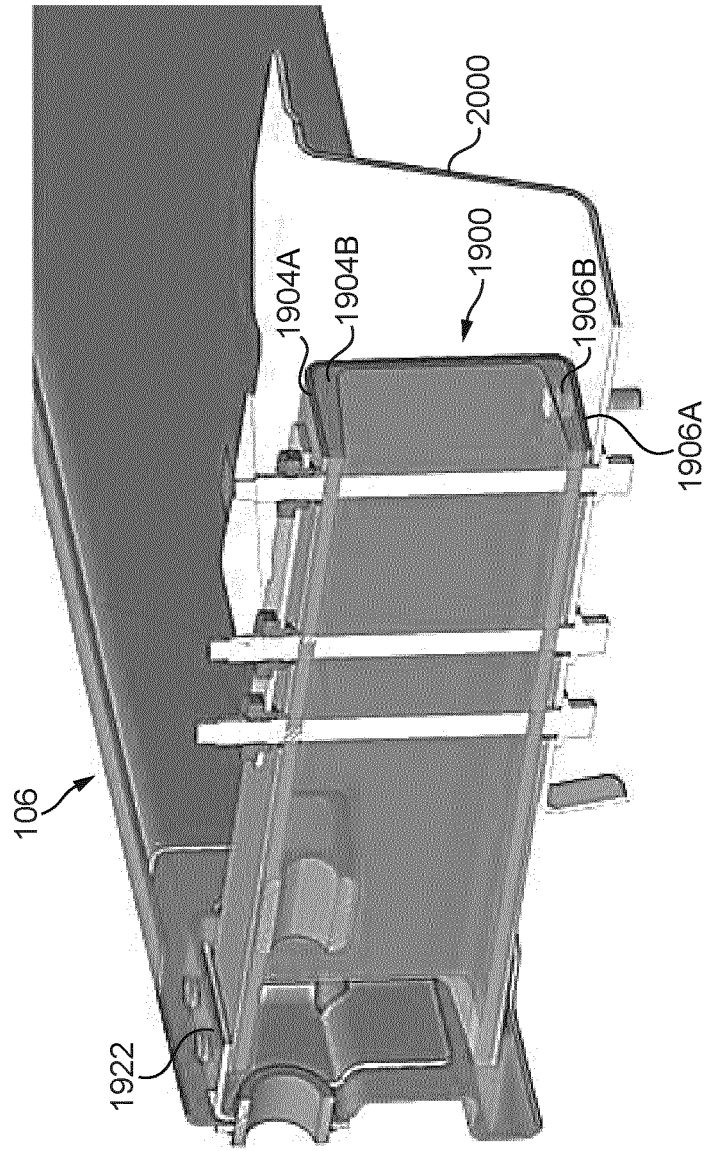
FIG. 20 shows a longitudinal sectional view of the crush can shown in FIG. 18.

As shown in FIGS. 19 and 20, the crush can 1900 is mounted to the body structure of the vehicle 2000. The energy management system comprises a metal bumper beam 106 attached to first and second crush cans 1900 disposed on opposing sides of the body structure. Each crush can 1900 is mounted to the body structure by one or more mechanical fasteners 1918 located in the fixing apertures 1916. In the present embodiment, the mechanical fasteners 1918 comprise three (3) bolts disposed in the fixed apertures 1916. One or more load plate 1920 is provided for distributing loads applied to the crush can 1900 by the mechanical fasteners 1918. The load plate(s) 1920 comprises a metal plate in the present embodiment. The load plate(s) 1920 could optionally be integrated with the outer portion 1908 of the crush can 1900, for example in one or both of the sidewalls 1904, 1906. The mechanical fasteners 1918 mount the crush can 1900 to the body structure and also prevent relative movement of the outer portion 1908 and the inner portion 1910 of the crust can 1900. A bracket 1922 is provided at the distal end of each crush can 1900 to mount the metal bumper beam 106. The bracket 1922 is fastened to the sidewalls of the crush can 1900 by mechanical fasteners 1918. In a variant, the bracket 1922 may be formed integrally with the crush can 1900, for example in the form of an integral flange.

The crush can 1900 may optionally comprise an internal structure. The internal structure may, for example, be suitable for fixedly mounting an accessory, such as a towing eye or the like. The one or more mechanical fastener 1918 may extend through a fixing aperture formed in the internal structure to fasten the internal structure to the outer portion 1908 and the inner portion 1910. The internal structure may be moulded within the crush can 1900 from a fibre reinforced material. The fibre reinforced material may be introduced into a hollow interior of the inner portion 1910. A further mould part may be introduced into the crush can 1900 to compress the fibre reinforced material within the crush can 1900. A hydraulic press or like may be used to introduce the further mould part. The introduction of the mould part causes the fibre reinforced material to conform to an interior of the inner portion 1910. The mould part may also be configured to define a form or profile of the internal structure within the crush can 1900. The fibre-reinforced material is cured in the crush can 1900 and the split mould is then removed. The method of curing will depend on the fibre reinforced material being used, but may include heating, cooling, light exposure, chemical means or any other known method. The towing eye or the like may be configured to screw into the resulting internal structure moulded inside the crush can 1900.

Although the above embodiments show mechanical fixing means connecting the crush cans to the bumper beam, it will be understood that in alternative embodiments different fixing means could be used, such as an adhesive. In the event that an adhesive is used, the adhesive must join opposite ends of a non-frangible portion of the crush can to the vehicle body and the bumper beam, respectively. This ensures that the bumper beam will remain attached to the vehicle following a collision.

Figure 21:
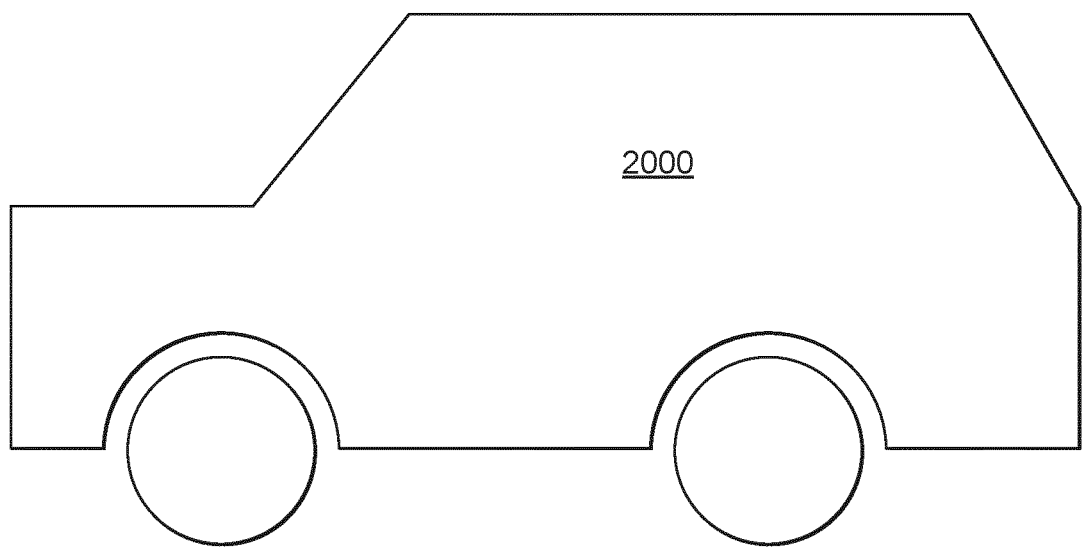
FIG. 21 shows a vehicle which may comprise components according to the previous FIGURES.

FIG. 21 shows a vehicle 2000 onto which the above crush can, component or energy management system could be attached.

All of the features disclosed in this specification and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

| FLOW CHART LABELS |
| --- |
| REF. LABEL (FIG. 8) |
| 850 START<br>852 PULL INDIVIDUAL STRANDS OF FIBRE FROM SPOOLS<br>854 PULL STRANDS THROUGH GUIDE PLATES TO FORM BUNDLES<br>856 PULL BUNDLES THROUGH RESIN BATH<br>858 PULL BUNDLES THROUGH A HEATED DIE<br>860 CUT PULTRUDED PROFILE INTO APPROPRIATE LENGTHS TO FORM A CRASH CAN |
| REF. LABEL (FIG. 12) |
| 1250 START<br>1252 PROVIDE A SUBSTANTIALLY HOLLOW CRUSH CAN<br>1254 INSERT A FIBRE REINFORCED MATERIAL INTO THE SUBSTANTIALLY HOLLOW CRUSH CAN<br>1256 MOULD THE FIBRE REINFORCED MATERIAL USING THE INTERNAL STRUCTURE OF THE SUBSTANTIALLY HOLLOW CRUSH CAN AND A FURTHER PART OF A SPLIT MOULD<br>1258 CURE THE FIBRE REINFORCED MATERIAL AND REMOVE SPLIT MOULD |

The invention claimed is:

1. A method of making a component comprising a crush can having an internal moulded structure, the method comprising:
   providing a substantially hollow crush can;
   inserting a fibre-reinforced material into the substantially hollow crush can;
   moulding said fibre-reinforced material using an internal shape of the substantially hollow crush can as an outer shell of a split mould, at least one further part of the split mould being inserted into the crush can to form said internal moulded structure.

2. The method of claim 1, wherein the substantially hollow crush can is a composite crush can.

3. The method of claim 1, wherein the internal moulded structure is made by compression moulding.

4. The method of claim 1, wherein the internal moulded structure is configured to receive a towing attachment.

5. The method of claim 4, wherein the internal moulded structure is internally threaded to compliment a threaded portion of said towing attachment.

6. The method of claim 1, further comprising attaching a towing attachment to the internal moulded structure.

7. The method of claim 4, wherein the towing attachment comprises a threaded shank at a first end and a towing eye at a second end, and wherein the towing attachment is attached to the internal moulded structure by screwing the first end into a corresponding feature in the internal moulded structure.

8. The method of claim 1, wherein the fibre-reinforced material comprises a plurality of fibres embedded in a polymeric material.

9. The method of claim 1, wherein the fibre-reinforced material is a sheet moulding compound.

10. The method of claim 1, wherein the internal moulded structure comprises reinforcing structure having a tapered wall.

11. The method of claim 1, wherein providing the substantially hollow crush can comprises providing the substantially hollow crush can configured to couple a bumper beam to a supporting structure of a vehicle, the substantially hollow crush can having a first fixing means at a first end, a second fixing means at a second end, a frangible portion and a non-frangible portion extending between and fixedly coupled to the first fixing means and the second fixing means.

* * * * *